US006226372B1

(12) United States Patent
Beebe et al.

(10) Patent No.: US 6,226,372 B1
(45) Date of Patent: May 1, 2001

(54) TIGHTLY INTEGRATED COOPERATIVE TELECOMMUNICATIONS FIREWALL AND SCANNER WITH DISTRIBUTED CAPABILITIES

(75) Inventors: Todd Beebe, Katy; Mark D. Collier, Helotes; Doug Conyers, San Antonio; Chris Hamlett, Bulverde; Stephen Faustino, San Antonio, all of TX (US)

(73) Assignee: Securelogix Corporation, San Antonio, TX (US)

( * ) Notice: Subject to any disclaimer, the term of this patent is extended or adjusted under 35 U.S.C. 154(b) by 0 days.

(21) Appl. No.: 09/457,494

(22) Filed: Dec. 8, 1999

Related U.S. Application Data

(63) Continuation-in-part of application No. 09/210,347, filed on Dec. 11, 1998.

(51) Int. Cl.[7] ...................................................... H04M 3/00

(52) U.S. Cl. .......................... 379/189; 379/145; 379/196; 713/201; 707/9; 709/225

(58) Field of Search ..................................... 379/145, 189, 379/196; 707/9; 713/201, 200, 202; 709/225

(56) References Cited

U.S. PATENT DOCUMENTS

| 4,332,982 | 6/1982 | Thomas . |
| 4,639,557 | 1/1987 | Butler et al. . |

(List continued on next page.)

FOREIGN PATENT DOCUMENTS

| WO 98/17072 | 4/1998 | (WO) . |
| WO 98/53635 | 11/1998 | (WO) . |

OTHER PUBLICATIONS http://www.tlogic.com/penetration.html.
http://www/m–tech.ab.ca/security/penetration.
http://www.m–tech.ab.ca/products/secmod/.
*www.sandstorm.net/phonesweep*; Sandstorm Enterprises, Inc. "Introducing PhoneSweep".
*www.bruck–inc.com/html/security/pentesting.htm*; "Penetration Test".

\* cited by examiner

*Primary Examiner*—Fan Tsang
*Assistant Examiner*—Bing Bui
(74) *Attorney, Agent, or Firm*—Haynes and Boone LLP

(57) ABSTRACT

A system and method for implementing a fully integrated and cooperative telecommunications firewall/scanner that can be deployed either as a standalone device, or over a large-scale distributed client-server architecture is described. In addition to providing enhanced telecommunications firewall and scanner security capabilities, the integrated telecommunications firewall/scanner provides the capability to ensure implementation of a corporate-dictated security structure, and event visibility and report consolidation requirements, across a globally-distributed enterprise, using policy-based enforcement of a Security Policy. In the most basic configuration, the integrated firewall/scanner performs continuous security access monitoring and control functions, keyword and content monitoring and control functions, and remote access authentication, initiating coordinated vulnerability assessments, as well as automatic synchronous adjustments to the Security Policy in response to the vulnerability assessment results. Additionally, firewall and scanner actions, assessment results, and responses can be consolidated in detailed or summary reports for use by security administrators for trend analysis and security posture decision-making. The same Security Policy is used by both the firewall and the scanner components of the integrated firewall/scanner during both their cooperative and independent operations.

71 Claims, 25 Drawing Sheets

U.S. PATENT DOCUMENTS

| | | |
|---|---|---|
| 4,653,085 | 3/1987 | Chan et al. . |
| 4,783,796 | 11/1988 | Ladd . |
| 4,876,717 | 10/1989 | Baron et al. . |
| 4,905,281 | 2/1990 | Surjaatmadja et al. . |
| 4,965,459 | 10/1990 | Murray . |
| 5,018,190 | 5/1991 | Walker et al. . |
| 5,276,529 | 1/1994 | Williams . |
| 5,276,687 | 1/1994 | Miyamoto . |
| 5,276,731 | 1/1994 | Arbel et al. . |
| 5,311,593 | 5/1994 | Carmi . |
| 5,345,595 | 9/1994 | Johnson et al. . |
| 5,351,287 | 9/1994 | Bhattacharyya et al. . |
| 5,436,957 | 7/1995 | McConnell . |
| 5,495,521 | 2/1996 | Rangachar . |
| 5,510,777 | 4/1996 | Pilc et al. . |
| 5,535,265 | 7/1996 | Suwandhaputra . |
| 5,557,742 | 9/1996 | Smaha et al. . |
| 5,606,604 | 2/1997 | Rosenblatt et al. . |
| 5,623,601 | 4/1997 | Vu . |
| 5,627,886 | 5/1997 | Bowman . |
| 5,684,957 | 11/1997 | Kondo et al. . |
| 5,706,338 | 1/1998 | Relyea et al. . |
| 5,745,555 | 4/1998 | Mark . |
| 5,805,686 | 9/1998 | Moller et al. . |
| 5,805,803 | 9/1998 | Birrelle et al. . |
| 5,812,763 | 9/1998 | Teng . |
| 5,826,014 | 10/1998 | Coley et al. . |
| 5,838,682 | 11/1998 | Dekelbaum et al. . |
| 5,854,889 | 12/1998 | Liese et al. . |
| 5,864,666 | 1/1999 | Shrader . |
| 5,892,903 | 4/1999 | Klaus . |
| 5,898,830 * | 4/1999 | Wesinger, Jr. et al. ............... 713/201 |
| 5,907,602 | 5/1999 | Pell et al. . |
| 5,918,019 | 6/1999 | Valencia . |
| 5,923,849 | 7/1999 | Venkatraman . |
| 5,931,946 | 8/1999 | Terada et al. . |
| 5,944,823 * | 8/1999 | Jade et al. ............................ 713/201 |
| 5,949,864 | 9/1999 | Cox . |
| 5,960,177 * | 9/1999 | Tanno .................................. 709/229 |
| 6,061,798 * | 5/2000 | Coley et al. ......................... 713/201 |
| 6,098,172 * | 8/2000 | Coss et al. .......................... 713/201 |
| 6,154,775 * | 11/2000 | Coss et al. .......................... 709/225 |

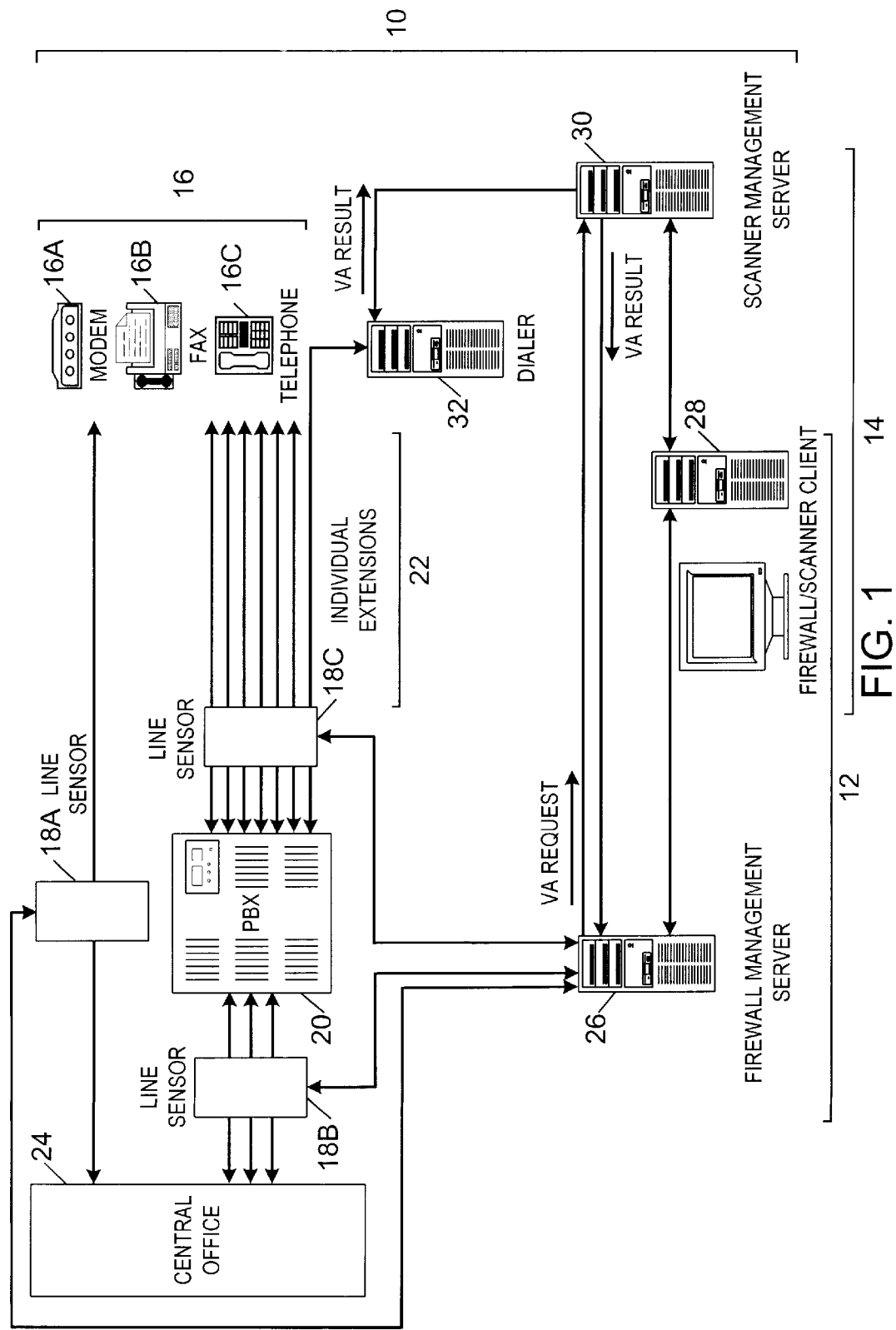

108

| GROUP | EXTENSION | COMMENT |
|---|---|---|
| SALES | 210-402-6417 THROUGH 210-402-6420 | USE TO GROUP ALL SALES VOICE-ONLY LINES |
| DIALER MODEM | 210-402-6901<br>210-402-6902<br>210-402-6903 | USE TO GROUP ALL DIALER MODEM LINES (OUTGOING CALLS ONLY) |
| ENGINEERING VOICE | 210-402-6912 THROUGH 210-402-6954 | USE TO GROUP ALL ENGINEERING VOICE ONLY LINES |
| ENGINEERING MODEM | 210-402-6904<br>210-402-6905<br>210-402-6906 | USE TO GROUP ALL ENGINEERING MODEM LINES |
| VOICE-ONLY (108A) | SALES<br>ENGINEERING VOICE<br>210-402-6643<br>210-402-6645 | USE TO GROUP ALL VOICE-ONLY LINES (SALES, ENGINEERING, RECEPTION, ACCOUNTING) |
| FAX (108B) | 210-402-6907<br>210-402-6908<br>210-402-6909 | USE TO GROUP ALL FAX LINES |
| ALL MODEMS (108C) | SECURE MODEM<br>INSECURE MODEM<br>UNAUTH. MODEM | USE TO GROUP ALL KNOWN MODEMS |
| SECURE MODEM (108D) | ENGINEERING MODEM<br>DIALER MODEMS<br>210-402-6911<br>210-402-6955 | USE TO GROUP ALL MODEMS DEEMED TO BE PROPERLY CONFIGURED AND/OR IMPENETRABLE |
| INSECURE MODEM (108E) | 210-402-6956<br>210-402-6457 | USE TO GROUP ALL MODEMS DEEMED TO BE IMPROPERLY CONFIGURED AND/OR PENETRABLE |
| UNAUTHORIZED MODEM (108F) | 210-402-6912<br>210-402-6418 | USE TO GROUP UNAUTHORIZED BUT IMPENETRABLE MODEMS AND UNKNOWN MODEMS PENDING VULNERABILITY ASSESSMENT |

FIG. 4

| RULE | SOURCE | DESTINATION | TYPE | ACTION | TRACK | DATE | INSTALL ON | TIME | COMMENT |
|---|---|---|---|---|---|---|---|---|---|
| 1 | ANY | DIALER MODEMS | ALL | DENY | REAL-TIME ALERT, PAGE, LOG | ANY | ALL | ANY | ALERT ON POTENTIAL HACKERS |
| 2 | DIALER MODEM | ANY | MODEM | ALLOW | | ANY | ALL | ANY | ALLOWS DIALER TO SCAN EXTENSIONS MONITORED BY FIREWALL WITHOUT CAUSING "FALSE" POTENTIAL HACKER ALARM |
| 3 | SECURE MODEM | ANY | MODEM | ALLOW | LOG | ANY | ALL | ANY | ALLOWS OUTBOUND MODEM CALLS FROM SECURE MODEMS |
| 4 | ANY | SECURE MODEM | MODEM | ALLOW | LOG | ANY | ALL | ANY | ALLOWS INBOUND MODEM CALLS TO SECURE MODEMS |
| 5 | INSECURE MODEM | ANY | MODEM | DENY | EMAIL, LOG | ANY | ALL | ANY | DENYS OUTBOUND MODEM CALLS FROM INSECURE MODEMS |
| 6 | ANY | INSECURE MODEMS | MODEM | DENY | EMAIL, LOG | ANY | ALL | ANY | DENYS INBOUND MODEM CALLS TO INSECURE MODEMS |
| 7 | UNAUTH. MODEM | ANY | MODEM | ALLOW | EMAIL, LOG | ANY | ALL | ANY | ALLOWS OUTBOUND MODEM CALLS FROM UNAUTHORIZED MODEMS |
| 8 | ANY | UNAUTH. MODEMS | MODEM | ALLOW | EMAIL, LOG | ANY | ALL | ANY | ALLOWS INBOUND MODEM CALLS TO UNAUTHORIZED MODEMS |

FIG. 5A

| | | | | | | |
|---|---|---|---|---|---|---|
| 9 | ANY | ANY | MODEM | DENY | PENETRATE, LOG | ANY | DENYS USE OF MODEM ON VOICE AND FAX LINES. ASSESSES VULNERABILITY OF UNKNOWN MODEM. ALERT ON POTENTIAL HACKERS |
| 10 | FAX | ANY | VOICE | DENY | EMAIL, LOG | ANY | DENYS USE OF FAX LINE FOR VOICE CALLS |
| 11 | VOICE-ONLY | ANY | VOICE | ALLOW | LOG | ANY | ALLOWS OUTBOUND VOICE CALLS |
| 12 | ANY | VOICE-ONLY | VOICE | ALLOW | LOG | ANY | ALLOWS INBOUND VOICE CALLS |
| 13 | ANY | ANY | ANY | DENY | LOG | ANY | DENYS AND LOGS ALL OTHER CALLS |

FIG. 5B

| RRP RULE | CURRENT GROUP | ATTEMPT | RESULT | TRACK | ADJUST POLICY? | MOVE TO | COMMENT |
|---|---|---|---|---|---|---|---|
| 1 | SECURE MODEM | PENETRATE | SUCCESS | PAGE, LOG | YES | INSECURE MODEM | MOVE EXTENSION TO INSECURE MODEM |
| 2 | SECURE MODEM | PENETRATE | FAILED | LOG | NO | N/A | NO CHANGE IS MADE TO THE SECURITY POLICY |
| 3 | INSECURE MODEM | PENETRATE | SUCCESS | LOG | NO | N/A | NO CHANGE IS MADE TO THE SECURITY POLICY |
| 4 | INSECURE MODEM | PENETRATE | FAILED | EMAIL, LOG | NO | N/A | ADMINISTRATOR MOVES TO SECURE OR UNAUTHORIZED |
| 5 | UNAUTH. MODEM | PENETRATE | SUCCESS | PAGE, LOG | YES | INSECURE MODEM | MOVE EXTENSION TO INSECURE MODEM |
| 6 | UNAUTH. MODEM | PENETRATE | FAILED | LOG | NO | N/A | NO CHANGE IS MADE TO THE SECURITY POLICY |
| 7 | ANY | PENETRATE | SUCCESS | PAGE, LOG | YES | INSECURE MODEM | MOVE EXTENSION TO INSECURE MODEM |
| 8 | ANY | PENETRATE | FAILED | EMAIL, LOG | YES | UNAUTH. MODEM | MOVE EXTENSION TO UNAUTHORIZED MODEM |
| 9 | !ALL MODEM | IDENTIFY | EZ-CRACK | PAGE, LOG | YES | INSECURE MODEM | MOVE EXTENSION TO INSECURE MODEM |
| 10 | !ALL MODEM | IDENTIFY | TUF-NUT | EMAIL, LOG | YES | UNAUTH. MODEM | MOVE EXTENSION TO UNAUTHORIZED MODEM |
| 11 | !ALL MODEM | IDENTIFY | FAILED | LOG | YES | UNAUTH. MODEM | MOVE EXTENSION TO UNAUTHORIZED MODEM |

FIG. 6

| I.D. NO. | DIALER | GROUP | TIME | DETECT | ASSESSMENT | COMMENT |
|---|---|---|---|---|---|---|
| 1 | SAN ANTONIO | VOICE-ONLY | NOW | MODEM | IDENTIFY | USE TO DETECT MODEMS ON VOICE-ONLY EXTENSIONS AND IDENTIFY SOFTWARE/SYSTEM OPERATING MODEM. |
| 2 | SAN ANTONIO | FAX | NOW | MODEM | IDENTIFY | USE TO DETECT MODEMS ON FAX EXTENSIONS AND IDENTIFY SOFTWARE/SYSTEM OPERATING MODEM. |
| 3 | SAN ANTONIO | ALL MODEMS | NOW | MODEM | PENETRATE | USE TO PENETRATE AND ASSESS VULNERABILITY OF ALL KNOWN MODEMS. |

FIG. 7

| RULE | CLASS | SOURCE | DESTINATION | TYPE | ACTION | TRACK | DATE | INSTALL ON | TIME | COMMENT |
|---|---|---|---|---|---|---|---|---|---|---|
| 1 | R | ANY | DIALER MODEMS | ALL | DENY | ROUTE, REAL-TIME ALERT(F), PAGE(F), LOG | ANY | ALL | ANY | ALERT ON POTENTIAL HACKERS. EVENT WILL BE LOGGED ON SUPERIOR SERVERS, ALERT AND PAGE FILTERED OUT. |
| 2 | R | DIALER MODEM | ANY | MODEM | ALLOW | LOG | ANY | ALL | ANY | ALLOWS DIALER TO SCAN EXTENSIONS MONITORED BY FIREWALL WITHOUT CAUSING "FALSE" POTENTIAL HACKER ALARM. NO ROUTING UPWARD. |
| 3 | R | SECURE MODEM | ANY | MODEM | ALLOW | LOG | ANY | ALL | ANY | ALLOWS OUTBOUND MODEM CALLS FROM SECURE MODEMS. NO ROUTING UPWARD. |
| 4 | R | ANY | SECURE MODEM | MODEM | ALLOW | LOG | ANY | ALL | ANY | ALLOWS INBOUND MODEM CALLS TO SECURE MODEMS. NO ROUTING UPWARD. |
| 5 | R | INSECURE MODEM | ANY | MODEM | DENY | ROUTE, EMAIL(F), LOG | ANY | ALL | ANY | DENYS OUTBOUND MODEM CALLS FROM INSECURE MODEMS. EVENT WILL BE LOGGED ON SUPERIOR SERVERS, EMAIL FILTERED OUT. |
| 6 | R | ANY | INSECURE MODEMS | MODEM | DENY | ROUTE, EMAIL(F), LOG | ANY | ALL | ANY | DENYS INBOUND MODEM CALLS TO INSECURE MODEMS. EVENT WILL BE LOGGED ON SUPERIOR SERVERS, EMAIL FILTERED OUT. |

| | | | | | | | |
|---|---|---|---|---|---|---|---|
| 7 | R | UNAUTH. MODEM | ANY | MODEM | ALLOW | ROUTE, EMAIL(F), LOG | ANY | ALL | ANY | ALLOWS OUTBOUND CALLS FROM UNAUTH. MODEMS. EVENT LOGGED ON SUPERIOR SERVERS, EMAIL IS FILTERED |
| 8 | R | ANY | UNAUTH. MODEMS | MODEM | ALLOW | ROUTE, EMAIL(F), LOG | ANY | ALL | ANY | ALLOWS INBOUND MODEM CALLS TO UNAUTHORIZED MODEMS. EVENT IS LOGGED ON SUPERIOR SERVER, EMAIL IS FILTERED OUT. |
| 9 | R | ANY | ANY | MODEM | DENY | ROUTE, PENETRATE(F), LOG | ANY | ALL | ANY | DENYS USE OF MODEM ON VOICE AND FAX LINES. ASSESSES VULNERABILITY OF UNKNOWN MODEM. EVENT IS LOGGED ON SUPERIOR SERVER, PENETRATION IS FILTERED OUT. |
| 10 | O | FAX | ANY | VOICE | DENY | EMAIL, LOG | ANY | ALL | ANY | DENYS USE OF FAX LINE FOR VOICE CALLS. NO ROUTING UPWARD. |
| 11 | O | VOICE-ONLY | ANY | VOICE | ALLOW | LOG | ANY | ALL | ANY | ALLOWS OUTBOUND VOICE CALLS. NO ROUTING UPWARD. |
| 12 | O | ANY | VOICE-ONLY | VOICE | ALLOW | LOG | ANY | ALL | ANY | ALLOWS INBOUND VOICE CALLS. NO ROUTING UPWARD. |
| 13 | R | ANY | ANY | ANY | DENY | ROUTE, LOG | ANY | ALL | ANY | DENYS AND LOGS ALL OTHER CALLS. EVENT IS LOGGED ON SUPERIOR SERVERS. |

FIG. 12D

TIGHTLY INTEGRATED COOPERATIVE TELECOMMUNICATIONS FIREWALL AND SCANNER WITH DISTRIBUTED CAPABILITIES

CROSS-REFERENCE TO RELATED APPLICATIONS

This application is a continuation-in-part of U.S. patent application Ser. No. 09/210,347 entitled TELEPHONY SECURITY SYSTEM filed Dec. 11, 1998, and is related to U.S. patent application Ser. No. 09/312,365 entitled A DISTRIBUTED SYSTEM AMD METHOD FOR SYSTEM IDENTIFICATION AND VULNERABILITY SCANNING filed May 14, 1999, both assigned to the assignee of the present application and incorporated by reference in their entireties.

TECHNICAL FIELD

The invention relates generally to telecommunications access control systems and particularly to an integrated telephony security system for controlling and logging access between end-user stations and their respective circuits into the public switched telephone network ("PSTN"), with coordinated system identification, vulnerability assessment scanning, and automatic security policy update capabilities.

BACKGROUND

"Policy-based security management" refers to the application of a governing set of rules at strategically located "chokepoints" for the purpose of enforcing security boundaries between two or more networks, such that only those events meeting certain criteria may pass between them, while all other events are denied passage. For network operations, this filtering process selectively discards packets in order to control access to a network as a whole, or to network resources such as files and devices. Variations and improvements of this basic concept have resulted in devices commonly referred to as "firewalls," which are network components that provide a security barrier between networks or network segments. Much like a guard at a checkpoint, the firewall strictly enforces rules specified within an established policy for what is to pass on a case-by-case basis. The policy may dictate that other actions apply as well, such as logging a security event and/or sending an urgent electronic mail message notifying appropriate personnel of the event.

Security professionals consider firewalls to be essential in the protection of an enterprise's private network or virtual private network from access by unauthorized personnel or "hackers." Like any security measure, however, firewalls are not foolproof. Firewalls focus on the "front door," the Internet, while failing to provide protection for the "back door," the telecommunications access to the data network. Traditional network firewalls provide no protection against unauthorized traffic routed to or from the network through devices such as modems connected to the unprotected telephone lines normally used for voice or fax.

The need for a system and method for controlling access to an enterprise's network through telephony resources that cannot be sufficiently protected by traditional network firewall technology is met by the telecommunications firewall described in U.S. patent application Ser. No. 09/210,347 entitled Telephony Security System. Unfortunately, usually as a result of budget constraints, or the sheer number of telecommunication trunks used by an enterprise, such telecommunications firewalls are often deployed incrementally across an organization, unavoidably leaving pockets of vulnerability created by unprotected telephone lines where the telecommunications firewall has not yet been deployed.

Nearly any individual with either malicious or benign intentions can easily connect a modem to an existing computer system and/or telephone or fax line. A telecommunications firewall monitoring the line on which the rogue modem has been installed will detect and neutralize such a device. However, if the device is installed on what may be one of hundreds or even thousands of telephone lines as-yet uncontrolled and unmonitored by the telecommunications firewall, the device effectively bridges the "untrusted" Public Switched Telephone Network ("PSTN") to an organization's "trusted" data network. Hackers and phreakers will often wardial to find these bridges, then gain access to the data network, potentially stealing and/or destroying valuable data behind the front line protection of both the network firewall and the partially deployed telecommunications firewall.

Although the currently available telecommunications firewalls enforce a security policy against incoming and outgoing calls, they are dependent upon the often understaffed and overworked security administrators to physically investigate a security event, such as traffic from an unknown modem on a designated voice or fax line, in response to the firewall's notification.

Similarly, the current telecommunications firewalls are reactive tools responding to security events, incapable of both proactively looking for unknown modems, and proactively evaluating the vulnerability of known modems operating on extensions the firewall monitors and controls.

Finally, after the security administrator manually performs a vulnerability assessment on an unauthorized modem, if a policy update is warranted, the security administrator must manually update the firewall's security policy himself.

Other security savvy organizations use telecommunications scanners, or "wardialers," to scan their telecommunication lines, searching for unauthorized or vulnerable modems that can be penetrated to gain access to the data network. In addition to performing vulnerability assessments, telecommunications scanners can be used to provide an organization with a "snap-shot" assessment of where modems exist.

Unfortunately, the currently available telecommunications scanners provide only limited visibility because they cannot provide the constant monitoring capabilities offered by telecommunications firewalls. Large enterprises have literally thousands of telecommunications lines that can take over a week to assess, and such infrequent vulnerability assessments cannot provide a continuous and up-to-date representation of the organization's security status.

Additionally, telecommunications scanners only report their findings and cannot enforce a security policy to deny access to or segregate unknown or penetrable modems. Like telecommunications firewalls, scanners are dependent upon the security administrators to physically respond to the scanner's detection of such modems.

Similarly, although they are detection and reporting tools, the currently available telecommunications scanners cannot send email, pager, real-time and/or SNMP alerts, nor can they adjust the security policy in response to their findings. Again, the task falls to the security administrator to analyze the scanner's findings and to manually adjust the scanner's security policy accordingly.

The shortcomings of current telecommunications firewalls and scanners are exacerbated when the previously described scenarios are applied to a globally distributed enterprise. Additionally, as such enterprises attempt to establish and enforce their security policies across their organization, they are challenged to either maintain valuable security personnel in each branch office or struggle to monitor and respond to all branch security events from the home office. One single computer handling all processing of a globally distributed enterprise would be quickly overloaded, and local users would have no control of or visibility into their own security status, so a firewall and scanner management server is most often installed at each location, to divide traffic load and manage a security policy on a more localized basis. Unfortunately, multiple independent firewalls and scanners present the challenge of ensuring the same basic security structure across the entire enterprise as well as the formidable task of consolidating local logging information to provide visibility into important local security events at the highest corporate level.

Neither the current telecommunications firewalls, nor the current telecommunications scanners are singly capable of providing continuous monitoring and policy enforcement with automatic vulnerability assessments in response to security events. Nor are they capable of executing automatic adjustments in the Security Policy in response to these vulnerability assessments. Nor do they offer distributed deployment capabilities that include a multi-tiered policy-based enforcement of the security policy to ensure implementation of a basic corporate-dictated security structure while providing varying degrees of localized control, and to define event visibility and report consolidation requirements. Clearly, what is needed is an integrated, cooperative telecommunications firewall and scanner with automatic policy adjustment and distributed deployment capabilities.

SUMMARY OF THE INVENTION

The present invention, accordingly, provides a system and method for implementing a fully integrated and cooperative telecommunications firewall/scanner that can be deployed either as a standalone device, or over a large-scale distributed client-server architecture. In addition to providing enhanced telecommunications firewall and scanner security capabilities, the integrated firewall/scanner provides the capability to ensure implementation of a corporate-dictated security structure, and event visibility and report consolidation requirements, across a globally-distributed enterprise, using policy-based enforcement of a Security Policy.

In the most basic configuration, the integrated firewall/scanner is capable of performing several advantageous security functions not enabled by either a firewall or scanner alone. The device is capable of performing continuous security access monitoring and control functions, keyword and content monitoring and control functions, and remote access authentication, initiating coordinated vulnerability assessments, and following through with automatic synchronous adjustments to the Security Policy in response to the vulnerability assessment results. Vulnerability assessments include, but are not limited to identification of operating systems/software controlling a modem, penetration of operating systems/software controlling a modem, and/or evaluating the content of a voice, fax or modem transmission. Additionally, firewall and scanner actions, assessment results, and responses can be consolidated in detailed or summary reports for use by security administrators for trend analysis and security posture decision-making. In this basic configuration, the same Security Policy is used by both the firewall and the scanner components of the integrated firewall/scanner during both their cooperative and independent operations.

A Security Policy is comprised of several elements, including a plurality of Groups of telephone numbers/extensions, a Security Rule Base, a Security Profile comprising one or more individual profiles, and a Result Response Policy. Groups of telephone numbers/extensions are shared by both the firewall and the scanner components and are comprised of extensions that share some commonality with other extensions in the same Group. Groups are used to "bundle" extensions together for convenience in applying the Security Policy. The Security Rule Base is used by the firewall and defines whether certain calls made to/from an extension in a Group will be allowed, denied (disconnected), monitored for content, recorded, and/or redirected, and whether other tracking tasks such as real-time alerts, pager, email or SNMP notification, logging or vulnerability assessments will be initiated. The Security Profile is used by the scanner and defines which Dialer will execute the calls, what telephone numbers or Groups of numbers will be dialed, and when the scan will be executed. The Security Profile also defines whether an attempt will be made to only detect the type of device on the line and whether an attempt to identify and/or penetrate (i.e., logon to) the software/system controlling a modem will be made. The Results Response Policy is shared by both the firewall and scanner components and defines whether additional actions are required, whether vulnerability assessment results ("VA Results") will be logged, whether notifications will be initiated, and whether automatic adjustments will to be made to the Security Policy.

In one aspect, the firewall monitors and controls access to the telecommunications lines on which it is deployed and will either allow or deny a call, monitor call content, redirect and/or record a call, log the event, and initiate an email, pager, SNMP, and/or real-time notification. In response to detection of an unknown modem connected to an extension, the firewall will send a vulnerability assessment request ("VA Request") to the scanner requesting the scanner to perform a vulnerability assessment of the unknown modem in accordance with the Security Rule Base contained within the Security Policy. When the firewall receives the VA Results of the penetration attempt from the scanner, if so defined by the Results Response Policy, the firewall will automatically adjust the Security Policy. This adjustment is made by moving the extension on which the vulnerability assessment was requested and performed into a different Group, thereby changing the manner in which future calls on that extension will be handled.

In another aspect, when the source or destination phone number/extension is not available to the firewall from the trunks for use in policy rule enforcement, the firewall will use a weighted correlation algorithm and Station Message Detail Recording ("SMDR") or Call Detail Recording ("CDR"), output by the PBX, to determine the missing information and enforce the Security Policy.

In another aspect, the scanner routinely performs scheduled scans of enterprise telecommunication lines based on the Security Profile contained within the Security Policy. These scans are executed in addition to and independently of scans performed in response to VA Requests received from the firewall. When the scanner detects an unknown modem while executing a routine Security Profile, in accordance with the Result Response Policy, the scanner will send an alert to security administrators, log the event, and automatically adjust the Security Policy. This adjustment is made by moving the extension on which the unknown modem was found into a different Group, thereby changing the manner in which future calls on that extension will be handled.

In this and other aspects, the scanner will conduct scans on several Security Profiles simultaneously. When the scanner receives a VA Request from the firewall, a Security Profile is created from the request and is added to the other VA Requests or routinely scheduled Security Profiles being executed at that time. The scanner addresses multiple Security Profiles in "round-robin" fashion (dialing one number from the first Security Profile, next dialing one number from the second Security Profile, then dialing one number from the third Security Profile, and so on.

In yet another aspect, the scanner is used to continuously assess extensions on which the firewall has not yet been deployed. Specifically, in the event that the firewall is not fully deployed on all trunks of an organization, in accordance with the Security Profile contained within the Security Policy, the scanner will supplement firewall security by continuously scanning all extensions on which the firewall is not yet deployed, detecting unknown modems, assessing the vulnerability of detected modems, notifying security administrators, and automatically adjusting the Security Policy in response to the vulnerability assessments.

In yet another aspect, the scanner is used to proactively verify the security status of all modems by continuously scanning all extensions with known modems and attempting to penetrate those modems. If the scanner successfully penetrates a modem, in accordance with the Result Response Policy, the scanner will send an alert to security administrators, log the event, and automatically adjust the Security Policy. This adjustment is made by moving the extension of the penetrated modem into a different Group, thereby changing the manner in which future calls on that extension will be handled.

In another aspect, the scanner will be used to proactively verify the software or operating system controlling a modem. There is a level of security inherent with specific brands of modem controlling systems/software. Some widely used products are notorious in security circles for their poor security and ease of access by unauthorized personnel. Scans attempting to identify modem systems/software are more resource-efficient than scans attempting penetration of the modem systems/software. When a profile with a large quantity of designated voice and fax extensions is to be executed, it is advantageous to use the scanner to "pre-sort" unknown modems by software/system, as they are detected, prior to attempting penetration. If the scanner identifies an unknown modem, in accordance with the Result Response Policy, the scanner will send an alert to security administrators, log the event, and/or automatically adjust the Security Policy by moving the extension of the previously unknown modem into a different Group. If the identified software/system is a notoriously insecure and undesirable product, the extension will be placed in a Group for insecure modems. Conversely, if the software/system is acceptable to the security administrators, the extension will be placed in a Group for unauthorized modems.

In another aspect, all events, actions, results, and responses by both the firewall and scanner components are logged and published in consolidated detailed and summary reports produced for use by the security administrator in assessing the organization's security posture. This consolidated reporting eliminates the labor-intensive task of manually compiling two separate firewall and scanner logs, and provides sorting and filtering capabilities for focusing on targeted security concerns.

In yet another aspect, the visibility into security events and the consolidation of reporting of security events across a distributed enterprise will be defined and enforced using a multi-tiered policy-based environment. Hence, the specific information to be reported upward is defined, and visibility into only the most important local security events at the corporate level is consistently provided.

In still another aspect, the multi-tiered policy-based environment will be used to ensure a basic security structure across an enterprise. A "corporate" management server oversees multiple "regional" management servers, each of which oversees multiple "branch" management servers, and so on down the tier. The corporate management server defines a basic security policy to the regional management servers, each of which in turn defines and disseminates a fundamentally similar security policy to the branch management servers below them, and so on down the tier. Each management server within the multi-tiered environment enforces the security policy for its local sensors, and in accordance with the management server's position within the tier, may also oversee management servers below it.

In another aspect, all events, actions, results, and responses by both the firewall and scanner components can be monitored "live," allowing security administrators to watch the real-time performance of both the firewall and the scanner components.

A technical advantage achieved with the invention is that it enables the firewall and the scanner to share common data and policies used by both components, such as telephone numbers, Groups of telephone numbers/extensions, and the Result Response Policy.

Another technical advantage achieved with the invention is its ability to determine the source or destination phone number/extension using SMDR or CDR from the PBX, when the source or destination extension information is not available to the firewall on the trunks.

Another technical advantage achieved with the invention is the ability of the firewall to, in accordance with the Result Response Policy, automatically adjust the Security Policy in response to security events.

Another technical advantage achieved with the invention is the ability of the scanner to, in accordance with the Result Response Policy, automatically adjust the Security Policy in response to security events.

Yet another technical advantage achieved with the invention is its ability to automatically and synchronously adjust the Security Policy used by both the firewall and the scanner components of the invention.

Still another technical advantage achieved with the invention is its ability to perform vulnerability assessments and provide security status "snap-shots" of telecommunications lines left unmonitored by a partially deployed firewall.

Another technical advantage achieved with the invention is the proactive confirmation of the security status of all modems.

Another technical advantage achieved with the invention is the proactive identification of the software or operating system controlling a modem.

Another technical advantage of the invention is the capability to generate consolidated detailed and summary reports of all firewall and scanner cooperative and independent actions, results, and responses.

Yet another technical advantage of the invention is the capability of "live" viewing of all firewall and scanner cooperative and independent actions, results, and responses.

Yet another technical advantage achieved with the invention is that a single user interface may be employed to control both the firewall and the scanner applications.

Still another technical advantage of the invention is that the firewall/scanner can be deployed locally as a standalone system, or distributed globally across an enterprise's telecommunications network. Additionally, when viewed from the perspective of a large, globally distributed enterprise, several of the previously mentioned technical advantages are of increased significance.

Another technical advantage of the invention is the ability to implement an enterprise-wide, multi-tiered policy-based enforcement of selective event logging and consolidated reporting to be relayed up the tier.

Yet another technical advantage of the invention is the ability to implement an enterprise-wide, multi-tiered policy-based enforcement of a corporate security policy establishing a basic security structure to be enforced from the top of the tier downward.

BRIEF DESCRIPTION OF THE DRAWINGS

FIG. 1 is a schematic block diagram of an integrated telecommunications firewall/scanner embodying features of the present invention.

FIG. 4 is a table illustrating an example Group list configuration for the firewall/scanner of FIG. 1.

FIGS. 5A and 5B are a table illustrating an exemplary Security Rule Base for the firewall/scanner of FIG. 1.

FIG. 6 is a table illustrating an example Result Response Policy for the firewall/scanner of FIG. 1.

FIG. 7 is a table illustrating an example Security Profile for the firewall/scanner of FIG. 1.

FIGS. 12C and 12D illustrate an exemplary Security Rule Base for use in implementing the system of FIGS. 12A and 12B.

DETAILED DESCRIPTION

Figure 1A:
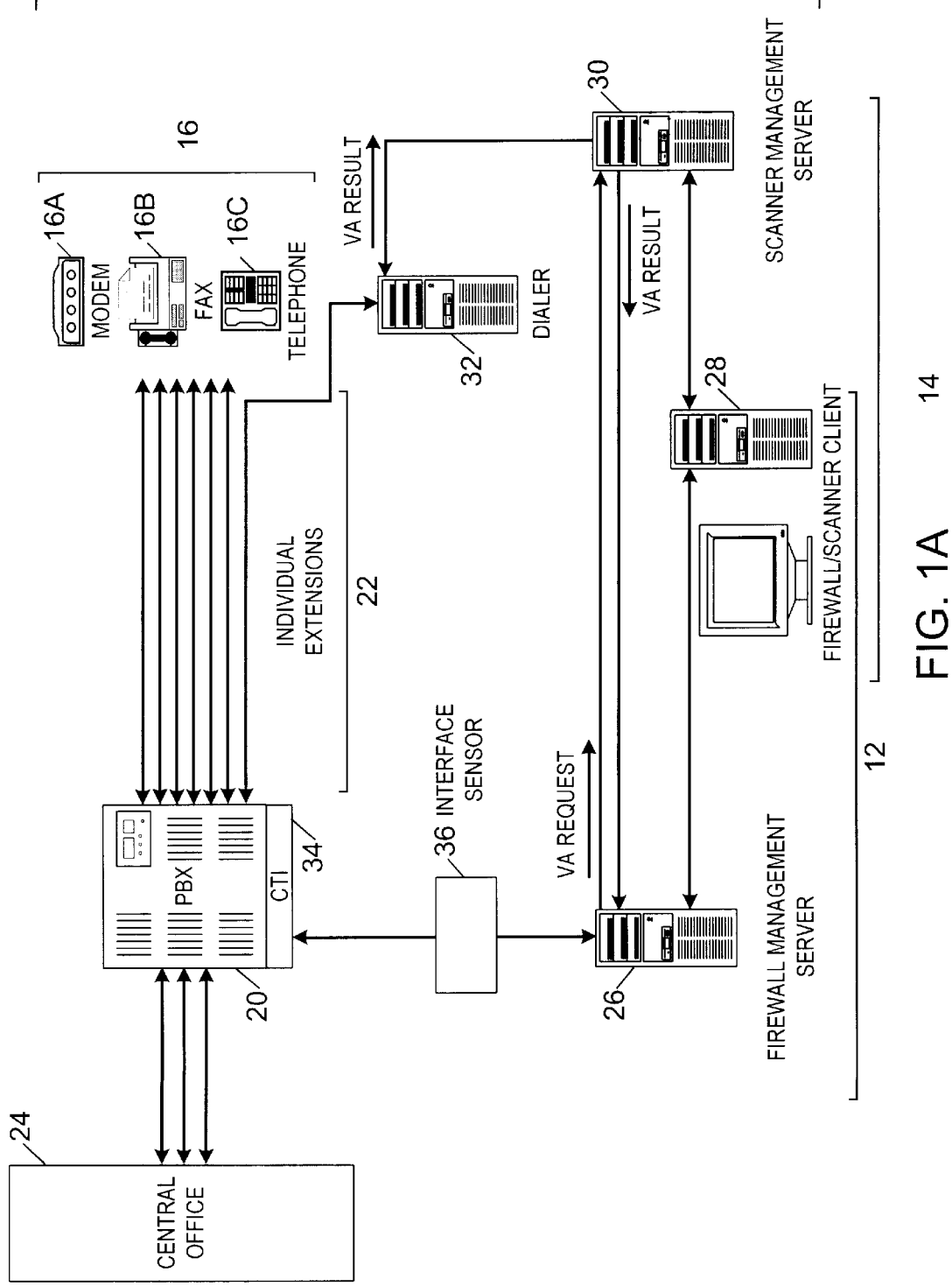
FIG. 1A is a schematic block diagram of an alternate embodiment of the firewall/scanner of FIG. 1.

FIG. 1 is a schematic block diagram of an integrated telecommunications firewall and scanner (firewall/scanner) 10 of the present invention. The firewall/scanner 10 comprises a telecommunications firewall component 12 electrically connected to a telecommunications scanner component 14 for interaction as described below. In a preferred embodiment, the firewall 12 is implemented as shown and described in U.S. patent application Ser. No. 09/210,347, which is hereby incorporated by reference in its entirety, and the scanner 14 is implemented as shown and described in U.S. patent application Ser. No. 09/312,365, which is also hereby incorporated by reference in its entirety.

Also in FIG. 1, a Firewall/Scanner Client 28 is the point of user interface for configuring a Security Policy (FIG. 2), displaying real-time alerts, viewing real-time event logs, printing event logs and consolidated reports, and other operational features of the firewall/scanner 10, as will be described in greater detail below. A Scanner Management Server 30 receives the Security Policy from the Firewall/Scanner Client 28, and in accordance with the Security Policy, pushes profiles to a Dialer 32 for execution. Although it is not shown, it is understood that multiple dialers, such as the Dialers 32, may be connected to the Scanner Management Server 30 in order to minimize the amount of time required to perform routinely scheduled scans and to maximize the frequency of scans and hence the value of the vulnerability assessment results.

A Firewall Management Server 26 receives the Security Policy from the Firewall/Scanner Client 26 and pushes a copy of the Security Policy to each of a plurality of Line Sensors 18A–18C. Each Line Sensor 18A–18C receives the Security Policy from the Firewall Management Server 26, monitors incoming and outgoing calls, and will allow, deny, or otherwise manipulate calls in accordance with the Security Policy.

The Line Sensors 18A–18C are connected in-line between end-user stations 16 of an enterprise and the stations' connections into the Public Switched Telephone Network ("PSTN"), at various points. In particular, Line Sensor 18A is connected to direct connect lines, Line Sensor 18B is connected to the trunk-side of the PBX 20, and Line Sensor 18C is connected to the station-side of the PBX 20. Line Sensors 18A–18C are not required at all of these points, but can be installed in accordance with the configuration of lines and the user's desired level of security control.

Also in FIG. 1, numerals 16A, 16B, and 16C designate end-user stations 16, representing as examples, one or more modems 16A, fax machines 16B, and telephones 16C. The modems 16A may be connected to a desktop or portable personal computer. Individual extensions 22 connect each of the stations 16 at Line Sensor 18C (or to the PBX if this type of line sensor is not present). As represented by Line Sensor 18C and its corresponding lines, it is understood that the firewall/scanner 10 is configured to map the individual extensions 22 through the firewall/scanner 10 to their respective wire pairs (not shown) within a PBX 20, and also to one or more telephone lines connected to a central office 24, as indicated at Line Sensor 18A. Several configurations are possible, whereby connectivity may be a combination of PBX trunk-side connections at Line Sensor 18B, or PBX station-side connections at Line Sensor 18C, and direct connects at Line Sensor 18A.

For an example scenario of the preferred embodiment, imagine all of the extensions 22 are placed in one of six Groups when the Security Policy is configured; Voice-Only, Fax, All Modems, Secure Modem, Insecure Modem, and Unauthorized Modem. (For purposes of illustration and simplicity, this example contains only six Groups, but a typical enterprise may have several more Groups.) The Voice-Only group contains all extensions designated exclusively for voice calls. The Fax group contains all extensions designated exclusively for fax use. The All Modems group is comprised of the Secure, Insecure, and Unauthorized Modem groups, and is used for convenience when executing policies and profiles against "all known modems". The Secure Modem group contains only those extensions with modems that are authorized by the security administrators and are deemed properly configured and impenetrable. The Insecure Modem group contains only those extensions with modems that are deemed improperly configured or penetrable. The Unauthorized Modem group contains those extensions with modems that are not authorized, but have not been penetrated.

Continuing with this example, if a Voice-Only extension sends or receives a modem call, one of the Line Sensors 18A–18C will evaluate the attributes of the call (source, destination, type of call, etc.), against a sequential list of rules comprising a "Security Rule Base" of the Security Policy. An exemplary applicable rule would read "Deny all modem traffic to/from an extension with an unknown modem, log the event, and attempt to penetrate the modem." Upon matching the rule to the call attributes, the Line Sensor will enforce the rule, thereby denying and terminating the call. If the source or destination number/extension is not available from the trunk or is not of sufficient fidelity to "fire" a rule, the Line Sensor will postpone execution of policy enforcement on the call until the missing attribute is supplied by the firewall component 12.

The Line Sensor will then notify the Firewall Management Server 26 that the specific rule has been matched or "fired" by call attributes on the specific Voice-Only extension, and that the rule has been enforced. The Firewall Management Server 26 will then perform tracking tasks, in accordance with the rule in the Security Rule Base, automatically logging the event and sending a vulnerability assessment request ("VA Request") to the scanner 14. Upon receiving the VA Request, the Scanner Management Server 30 will build a profile containing all pertinent scan information (including the extension, instructions to penetrate, etc.), and push the profile to the Dialer 32. The Dialer 32 will execute the profile by calling the extension and attempting to detect, identify and penetrate the software/system controlling the modem.

At this point, the Dialer 32 will send the vulnerability assessment results ("VA Results"), indicating specifically the success or failure of the penetration attempt, to the Scanner Management Server 30. The Scanner Management Server 30 will send the VA Results to the Firewall Management Server 26.

Upon receiving the VA Results, the Firewall Management Server 26 will evaluate the VA Results against a sequential list of response rules referred to as a "Results Response Policy" contained within the Security Policy. An exemplary applicable response rule would read "Move any extension with an unknown modem that has been successfully penetrated to the Insecure Modem group, generate a pager alert and log the event." Upon matching the response rule, the Firewall Management Server 26 will log the event, initiate a page, and adjust the Security Policy.

While not shown in FIG. 1, it is understood that more than one network-addressable firewall/scanner 10 may be utilized within an enterprise, at one or more locations, whereby security is provided by the device(s) for traffic into and out of a private network or virtual private network of the enterprise.

The inventive functions performed by the firewall/scanner 10, as further described below, may be implemented with commercially available components as will be understood by those skilled in the art. While also not shown, it is understood that the firewall component 12 and the scanner component 14 of the firewall/scanner 10 is controlled by computer programming instructions stored in memory within the firewall/scanner 10.

In an alternate embodiment shown in FIG. 1A, a Computer Telephony Interface ("CTI") device 34 is installed within the PBX 20 and an Interface Sensor 36 is installed in-line between the CTI device 34 and the Firewall Management Server 26. The Firewall Management Server 26 receives the Security Policy from the Firewall/Scanner Client 26 and pushes a copy of the Security Policy to the Interface Sensor 36. The scanner component 14 will continuously execute a scan using the "All Extensions" profile 104A, as discussed later with reference to FIGS. 2 and 7, to detect the type of device (fax, modem, or voice), on each extension.

The CTI device 34 will send call attributes, with the exception of call-type, to the Interface Sensor 36 in real-time. Call-type is determined as fax, modem, or voice by the most recent execution of the All Extensions profile 104A. The Interface Sensor 34 will evaluate the attributes of a call, including the known call-type, against the Security Rule Base of the Security Policy, and upon matching the rule to the call attributes, the Interface Sensor 36 will notify the CTI device 34 to enforce the rule, thereby allowing, denying or otherwise manipulating the call in accordance with the Security Policy. The Interface Sensor 34 will then notify the Firewall Management Server 26 that the specific rule has been "fired," and that the rule has been enforced. The Firewall Management Server 26 will then perform tracking tasks in accordance with the rule in the Security Rule Base and respond to assessments in accordance with the Result Response Policy, as previously described in the preferred embodiment.

Security Policy

Figure 2:
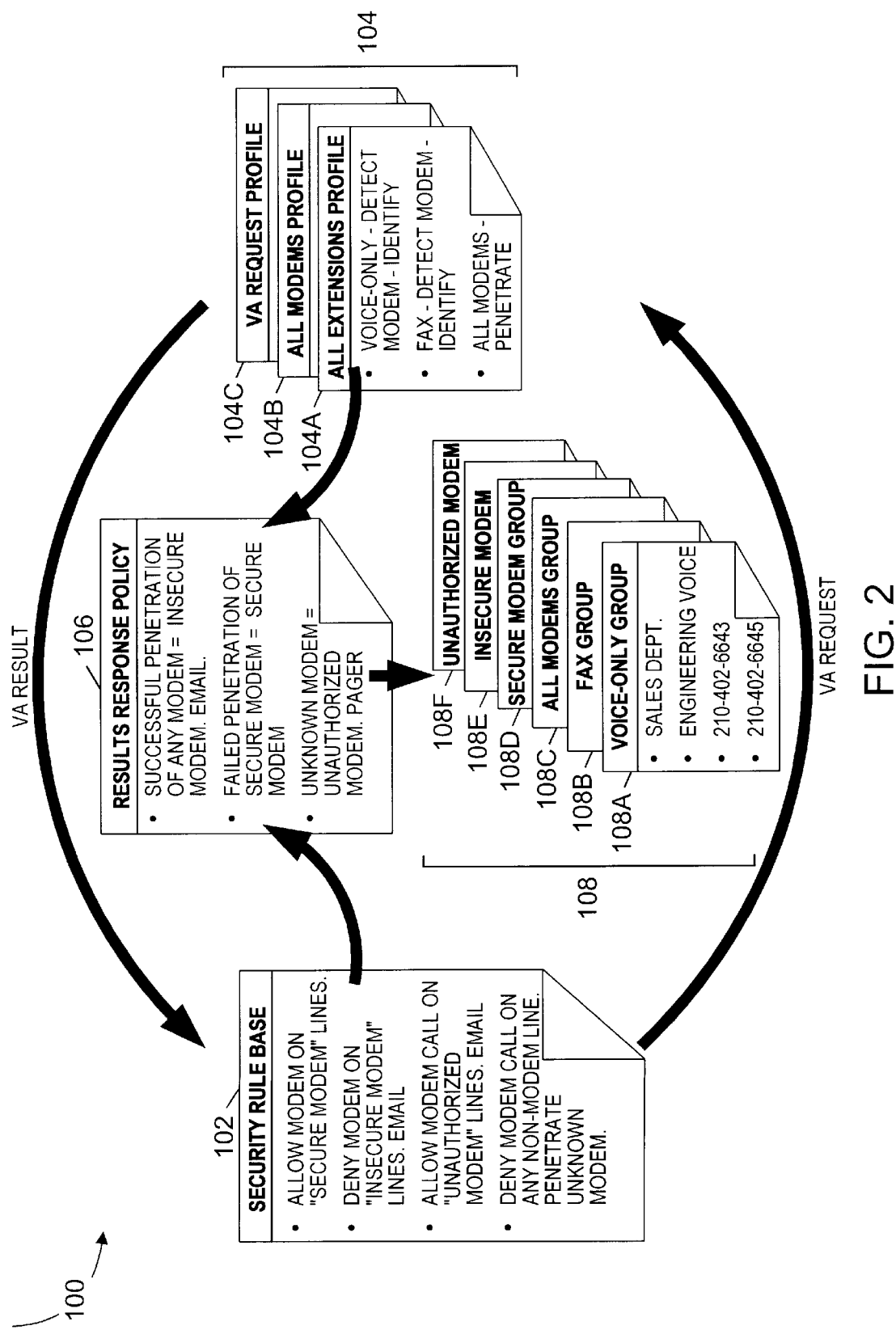
FIG. 2 is a schematic block diagram of the Security Policy for the firewall/scanner of FIG. 1 showing simplified example Security Policy elements and interactions.

FIG. 2 is a schematic block diagram of an exemplary Security Policy 100 for enforcement by the firewall/scanner 10 of FIG. 1. In a preferred embodiment, the Security Policy 100 includes a Security Rule Base 102, a Security Profile 104 comprising multiple profiles represented in FIG. 2 by profiles 104A, 104B, and 104C, a Results Response Policy 106, and a plurality of Groups 108, represented in FIG. 2 by groups 108A, 108B, 108C, 108D, 108E, and 108F. Although a plurality of Security Rule Bases, such as the Security Rule Base 102, with a plurality of corresponding Result Response Policies, such as the Result Response Policy 106, can be configured for a large globally distributed enterprise, for the sake of simplicity and clarity, only one of each component is shown in this diagram.

As shown in FIG. 2 and described below, the same Security Policy 100 is used by both the firewall and the scanner components 12, 14, of the firewall/scanner 10 during both their cooperative and their independent operations. When the telephone number contents of Groups 108 are adjusted by either the firewall 12 or the scanner 14, the Security Policy 100 is synchronously adjusted in both the firewall and the scanner components of the firewall/scanner 10.

The Security Rule Base 102, Result Response Policy 106, and Groups 108 are used by the firewall component 12 of the firewall/scanner 10 to control calls and respond to vulnerability assessments. The Security Rule Base 102 is a sequential listing of rules used exclusively by the firewall 12 that defines whether certain calls to an extension will be allowed, denied (hung-up), monitored for content, logged, or if other actions such as notifications or vulnerability assessments will be initiated. Vulnerability assessments include, but are not limited to identification of operating systems/software controlling a modem, penetration of operating systems/software controlling a modem, and/or evaluating the content of a voice, fax or modem transmission. The Results Response Policy 106 is a sequential listing of response rules (similar in construction to a Security Rule Base 102), which defines the appropriate response to VA Results received by the firewall from the scanner. The Results Response Policy 106 defines whether the VA Results will be logged or whether other actions, such as notifications or automatic adjustments to the contents of groups 108A–108F (and hence to the Security Policy 100), will be initiated. Groups 108A–108F are used by both the Security Rule Base 102 and the Results Response Policy 106 to indicate specific extensions. The Security Policy 100 will be adjusted by the firewall component 12, in accordance with the Results Response Policy 106, by moving an extension from one group 108A–108F to a different group 108A–108F.

For example, assume that the firewall 12 has detected traffic to/from an unknown modem on an extension in the Voice-Only group 108A. In accordance with the Security Rule Base 102, the firewall 12 will send a VA Request to the scanner 14 and the scanner will prepare a profile, represented in FIG. 2 by the profile 104C, for that specific VA Request. The scanner 14 will execute the VA Request-specific profile 104C and send the VA Results to the firewall. If the VA Results report successful penetration of the software/system controlling the modem, in accordance with the Results Response Policy 106, the firewall 12 will move the extension from the Voice-Only group 108A to the Insecure Modem group 108E, thereby denying any future modem traffic on the extension.

The Security Profile 104, Result Response Policy 106, and Groups 108 are used by the scanner component 14 of the firewall/scanner10 to execute routinely scheduled scans independently of the firewall 12, and to respond to the vulnerability assessment results of those independent scans. The Security Profile 104 includes a plurality of profiles, such as profiles 104A, 104B and 104C, that are used exclusively by the scanner 14 to execute scans targeting various extensions. A profile defines which groups 108A–108F, or individual extensions will be dialed, whether an attempt will be made to only detect the type of device on the line, or whether an attempt to identify and/or penetrate (logon to) the software/system controlling a modem will be made, as well as when the scan will be executed. Like the firewall 12, the scanner 14 will adjust the Security Policy 100 in response to the results of the executed profile, in accordance with the Results Response Policy 106, by moving an extension from one group 108A–108F to a different group 108A–108F. Examples of profiles for routine scans are the All Extensions profile 104A, which would execute a scan targeting all extensions or the All Modems profile 104B which would execute a scan targeting all extensions with known modems. The VA Request profile 104C represents the plurality of profiles prepared and executed by the scanner 14 in response to a specific VA Request from the firewall 12. Groups 108A–108F are used by both the Security Profile 104 and the Results Response Policy 106 to represent specific extensions.

A typical scenario of the scanner 14 component executing routinely scheduled scans independent of the firewall is the execution of the All Modems profile 104B, which in a preferred implementation will be run continuously by an organization to proactively verify the security status of all modems by continuously scanning and attempting to penetrate all extensions with known modems. If the scanner 14 successfully penetrates a modem in the Secure Modem group 108D or Unauthorized Modem group 108F, in accordance with the Result Response Policy 106, the scanner will send an alert to security administrators, log the event, and automatically adjust the Security Policy by moving the extension of the penetrated modem into the Insecure Modem group 108E, thereby denying all future modem traffic to that extension. If the scanner 14 successfully penetrates a modem in the Insecure Modem group 108E, in accordance with the Result Response Policy 106, the scanner will log the event, but no adjustment will be made to the Security Policy 100 and modem traffic will continue to be denied to that extension.

Installation, Configuration and Operation

Figure 3A:
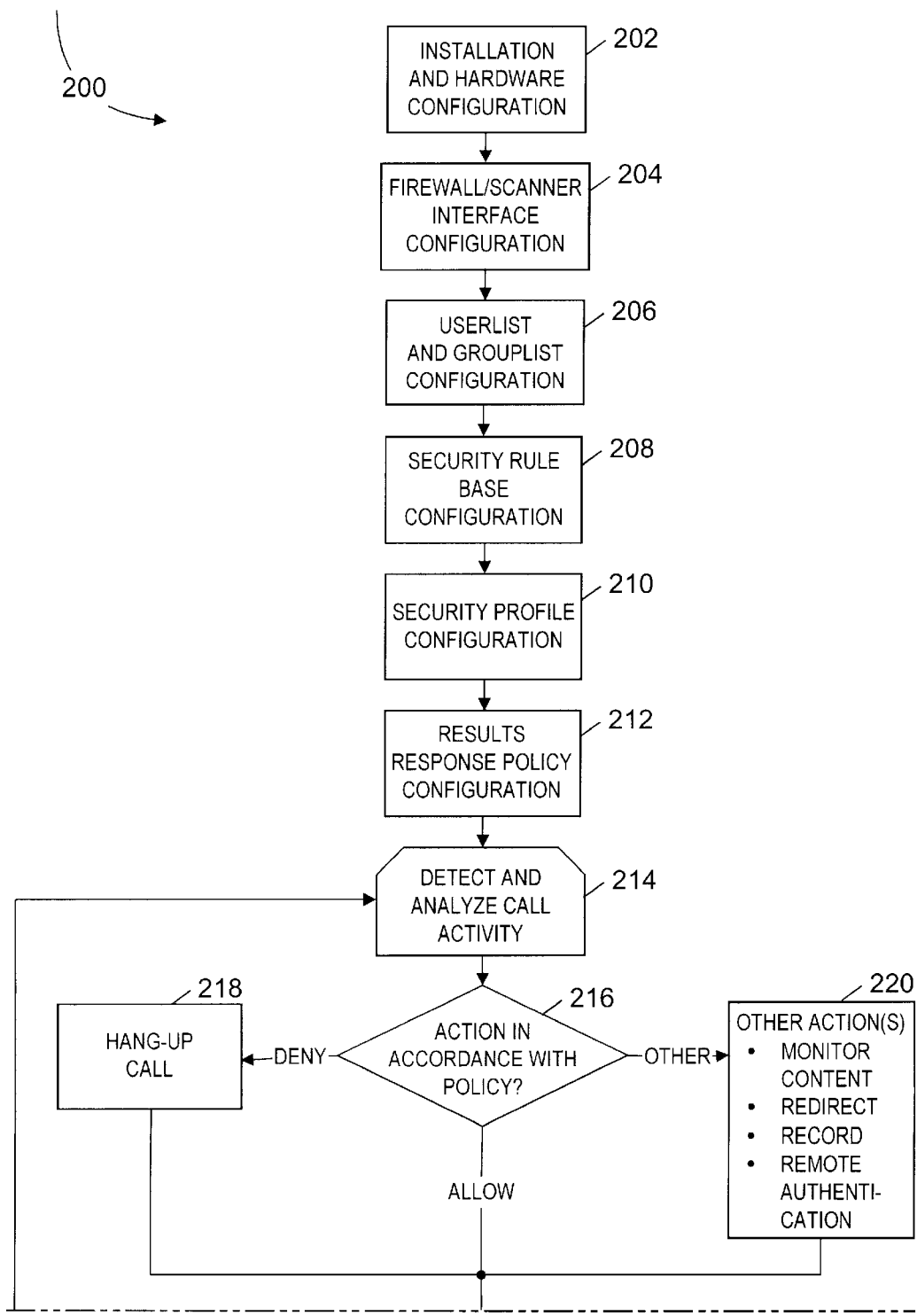
FIGS. 3A and 3B are a process flow diagram illustrating installation, configuration and operational processes for the firewall/scanner of FIG. 1.
Figure 3B:
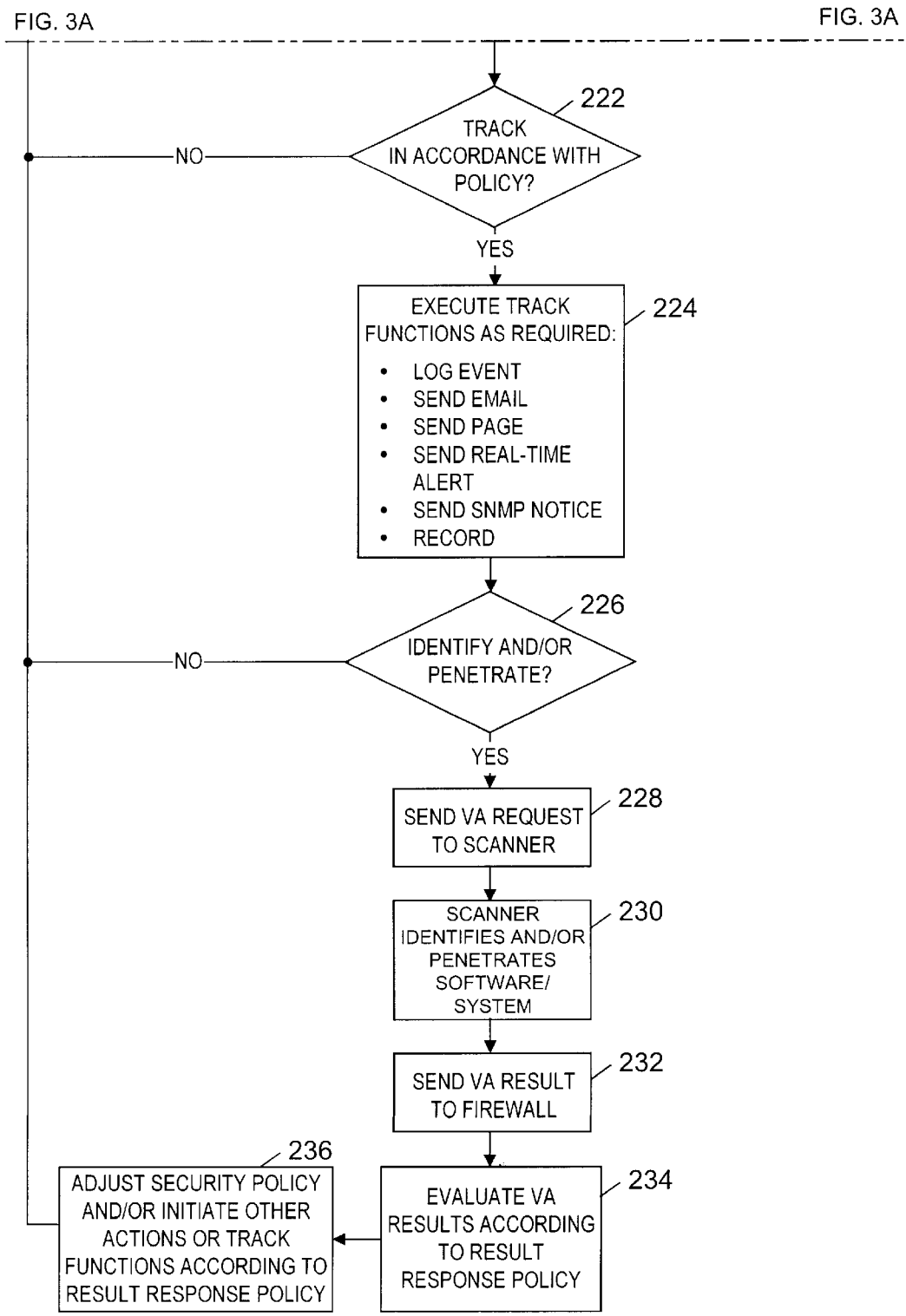

FIGS. 3A and 3B together comprise a process flow diagram 200 illustrating installation, configuration and operation processes for the firewall/scanner 10. Once installed and configured, it is understood that the firewall/scanner 10 is capable of operating in a continuous loop, detecting and analyzing call activity as well as dialing extensions and performing vulnerability assessments while simultaneously performing appropriate actions in accordance with the Security Policy 100.

Referring to step FIG. 3A, in step 202, the process of system installation and hardware configuration, as described in greater detail in U.S. patent application Ser. Nos. 09/210,347 and 09/312,365, is executed. In step 204, the process of interface configuration of the firewall and scanner components 12 and 14. In step 206, user list and groups 108 are configured, as described below with reference to FIG. 4. In step 208, the Security Rule Base 102 is configured, as described below with reference to FIGS. 5A and 5B. In step 210, the Security Profile 104 is configured, as described below with reference to FIG. 7. In step 212, the Results Response Policy 106 is configured, as described below with reference to FIG. 6.

The process of call detecting and analyzing call activity begins in step 214. For each station 16 connected to the firewall/scanner 10, the firewall/scanner will capture and analyze attributes of call activity, then consolidate and report details of the activity for further processing. If the source or destination number/extension is not available from the trunk or is not of sufficient fidelity to use in policy rule enforcement, the firewall 12 will use a weighted correlation algorithm and SMDR or CDR to determine the missing information and enforce the Security Policy, as described in detail below with reference to FIGS. 10A–10D. In step 216, a determination is made by the Security Rule Base 102 as to what actions to take for a particular call, depending upon attributes of the call as determined in step 214. As previously described, the Security Rule Base 102 is configured to meet the security needs of the enterprise, which may include allowing the call, in which case execution proceeds directly to step 222, denying the call, in which case execution proceeds to step 218, or performing other actions such as monitoring call content, redirecting the call to another extension, and/or recording the call, in which case execution proceeds to step 220.

Referring now to FIG. 3B, in step 222, a determination is made whether tracking functions are to be performed in accordance with the Security Policy 100. If so, in step 224, the Security Rule Base 102 dictates tracking functions to be performed, such as event logging, email, pager, real-time and/or SNMP notifications, and/or content recording are to be performed. While not shown, it is understood that there will be different levels of log entries and notifications, ranging from very brief to verbose.

In step 226, a determination is made whether the Security Rule Base 102 dictates that the scanner 14 will attempt to identify and/or penetrate the software/operating system controlling a modem. If so, execution proceeds to step 228, in which the process of the Firewall Management Server 26 sending a VA Request to the Scanner Management Server 30 is executed. In step 230, the Scanner Management Server 30 builds a profile from the information contained in the VA Request, contacts the Dialer 32, and downloads the profile to the Dialer, at which point the Dialer executes the penetration attempt and sends the results of the penetration attempt ("VA Results") to the Scanner Management Server 30. In step 232, the process of the Scanner Management Server 30 sending the VA Results to the Firewall Management Server 26 is executed. In step 234, the Result Response Policy 106 dictates what action to take in response to the vulnerability assessment results of the identification or penetration attempt. The Result Response Policy 106 may dictate that the Security Policy 100 be adjusted and/or notifications be initiated and the event logged, as in step 236.

An example Security Rule Base 102 is discussed below with reference to FIGS. 5A and 5B. An example Results Response Policy 106 is discussed below with reference to FIG. 6. An example Security Profile 104 is discussed below with reference to FIG. 7.

Security Policy—Group Listing

FIG. 4 illustrates a portion of an exemplary Group listing of the Groups 108 (FIG. 2), for use in connection with the firewall/scanner 10, and as previously mentioned with respect to step 206 in FIG. 3A. As described in greater detail in U.S. patent application Ser. No. 09/210,347, the Group listing shown in FIG. 4 defines an organizations' extensions in relation to their commonality with other extensions.

Groups are used to "bundle" extensions together by commonality for convenience in applying the Security Policy 100. For example, all extensions with secure modems are listed in the Secure Modem group 108D, and elements of the Security Policy 100 that deal with extensions with secure modems refer specifically to the Secure Modem group. Similarly, all extensions with known modems are listed in the All Modems group 108C and elements of the Security Policy that deal with all known modems refer specifically to the All Modems group.

Security Policy—Security Rule Base

FIGS. 5A and 5B illustrate portions of an exemplary Security Rule Base, such as the Security Rule Base 102, for use in connection with the firewall/scanner 10, and as previously mentioned with respect to step 208 in FIG. 3A. As described in greater detail in U.S. patent application Ser. No. 09/210,347, the Security Rule Base 102 shown in FIGS. 5A and 5B defines "rules" that, based upon call attributes of "Source," "Destination," "Call-type," "Date," and "Time," implement an "Action," and initiate notification, logging, and vulnerability assessment ("Track"). Additionally, each rule has a sensor deployment location "Install On", allowing an enterprise to implement one single Security Policy 100 containing rules designated to be applied in specific locations.

Rules 1–13, are explained as follows, it being understood that the Security Rule Base shown in FIGS. 5A and 5B may include any number and types of rules as described in U.S. patent application Ser. No. 09/210,347. It should be further understood that each rule is evaluated in sequential order, exiting after any one rule matched the call attributes.

Rule 1

This rule states "Deny all calls to the extensions in the Dialer Modem group at any time, on any day, generate a page and a real-time alert, and log the call". This rule is installed on all Line Sensors 18A–18C. This rule might be used to alert security personnel to potential hacking attempts such as "wardialing"since the extensions dedicated to the Dialer 32 modems will make outgoing calls, but should never receive calls.

Rule 2

This rule states "Allow all calls from the extensions in the Dialer Modem group at any time, on any day, and log the call". This rule is installed on all Line Sensors 18A–18C. The extensions dedicated to the Dialer 32 modems will regularly call extensions in the organization in response to VA Requests or during routine scheduled scans. This rule ensures that the calls will be allowed and security event "false" alarms will not be generated for these specific non-voice/non-fax calls on voice and fax lines.

Rule 3

This rule states "Allow all outbound modem traffic from the extensions in the Secure Modem group at any time, on any day, and log the call". This rule is installed on all Line Sensors 18A–18C. This rule will allow business as usual, allowing users to send data via secure modems, while logging the call for accounting purposes.

Rule 4

This rule states "Allow all incoming modem traffic to the extensions in the Secure Modem group at any time, on any day, and log the call". This rule is installed on all Line Sensors 18A–18C. This rule will allow business as usual, allowing callers to send data via secure modems, while logging the call for accounting purposes.

Rule 5

This rule states "Deny all outbound modem traffic from the extensions in the Insecure Modem group at any time, on any day, generate an email notification, and log the call". This rule is installed on all Line Sensors 18A–18C. This rule will prevent outgoing calls from modems that have been penetrated and/or are deemed insecure.

Rule 6

This rule states "Deny all incoming modem traffic to the extensions in the Insecure Modem group at any time, on any day, generate an email notification, and log the call". This rule is installed on all Line Sensors 18A–18C. This rule will prevent incoming calls to modems that have been penetrated and/or are deemed insecure.

Rule 7

This rule states "Allow all outbound modem traffic from the extensions in the Unauthorized Modem group at any time, on any day, generate an email notification, and log the call". This rule is installed on all Line Sensors 18A–18C. This rule will allow users to send data via unauthorized, but secure modems, while notifying security administrators and logging the call for accounting purposes.

Rule 8

This rule states "Allow all incoming modem traffic to the extensions in the Unauthorized Modem group at any time, on any day, generate an email notification, and log the call". This rule is installed on all Line Sensors 18A–18C. This rule will allow users to send data via unauthorized, but secure modems, while notifying security administrators and logging the call for accounting purposes.

Rule 9

This rule states "Deny all modem traffic from/to any extension at any time on any day, attempt to penetrate the modem and log the call". This rule is installed on all Line Sensors 18A–18C. At first glance, this rule appears to prevent all modem calls, even on secure modems. This is not the case. Since this rule is placed below all other rules concerning known modem groups, only traffic from/to an unknown modem will fire this rule. This rule will therefore prevent all modem calls to and from unknown modems, and will initiate a penetration attempt on the software/system operating the modem.

Rule 10

This rule states "Deny all outgoing voice traffic from the extensions in the Fax group at any time, on any day, generate an email and log the call". This rule is installed on all Line Sensors 18A–18C. This rule will prevent outgoing voice calls on an extension dedicated for fax use.

Rule 11

This rule states "Allow all outbound voice calls from the extensions in the Voice-Only group at any time, on any day, and the call will be logged". This rule is installed on all Line Sensors 18A–18C. This rule will allow business as usual while logging the call for accounting purposes.

Rule 12

This rule states "Allow all incoming voice calls to the extensions in the Voice-Only group at any time, on any day, and log the call". This rule is installed on all Line Sensors 18A–18C. This rule will allow business as usual while logging the call for accounting purposes.

Rule 13

This catch-all rule states "Deny all calls from anywhere to anywhere at any time of any day, log the call". This rule is installed on all Line Sensors 18A–18C. At first glance, this rule seems to deny any call from anywhere. This is not the case. This rule is typically placed at the bottom of the sequential list of rules to deny and log all calls that do not fit into any of the preceding rules. Again, each rule is evaluated in sequential order, exiting immediately after any one rule matches the call attributes.

Security Policy—Result Response Policy

FIG. 6 illustrates a portion of an exemplary Result Response Policy, such as the Result Response Policy 106, for use in connection with the firewall/scanner 10, and as previously mentioned with respect to step 212 in FIG. 3A.

Determining the Result Response Policy 106 for the firewall/scanner 10 involves creating a set of response rules, collectively referred to as the Result Response Policy 106, that defines what action(s) will be performed responsive to the success or failure to penetrate a modem or the identification of the software/system operating a modem on extension in a particular group 108A–108F. For example, a rule might read "Move any extension in the Secure Modem group whose modem has been successfully penetrated to the Insecure Modem group, generate an email and log the event".

Referring to FIG. 6, an example Result Response Policy 106 defines rules that are based upon the extension's "Current Group," the "Attempt" that was made against the extension, the "Result" of the attempt, notification and event logging additional functions ("Track"), an option to automatically adjust the Security Policy ("Adjust Policy"), and the new group the extension will be placed in ("Move To").

When the Firewall Management Server 26 receives VA Results from the Scanner Management Server 30, the firewall references the Result Response Policy 106, to determine the appropriate response to the VA Results.

When the scanner component 14 of the firewall/scanner 10 executes scans independently of VA Requests from the firewall component 12, the Scanner Management Server 30 references the Result Response Policy 106 to determine the appropriate response to the results of the independent scan.

In FIG. 6, Rules 1–11 are explained as follows:

Rule 1

This rule states "Move any extension in the Secure Modem group whose modem has been successfully penetrated to the Insecure Modem group, generate a page and log the event". This rule will prevent future incoming and outgoing modem traffic on authorized, but penetrable modems.

Rule 2

This rule states "Log the event when attempts to penetrate an extension in the Secure Modem group have failed".

Rule 3

This rule states "Log the event when an extension in the Insecure Modem group has been successfully penetrated". No change in policy is necessary since traffic is already denied on insecure modems and successful penetration indicates that no change in configuration of the modem has been made that would make it secure and eligible to send or receive calls.

Rule 4

This rule states "Log the event and send an email notification when attempts to penetrate an extension in the Insecure Modem group have failed". This rule will notify security administrators to restore the extension to its original group and operation if it is deemed to be secure.

Rule 5

This rule states "Move any extension in the Unauthorized Modem group whose modem has been successfully penetrated to the Insecure Modem group, generate a page notification and log the event". This rule will prevent future incoming and outgoing modem traffic on unauthorized modems found to be penetrable.

Rule 6

This rule states "Log the event when attempts to penetrate an extension in the Unauthorized Modem group have failed".

Rule 7

This rule states "Move any extension with an unknown modem that has been successfully penetrated to the Insecure Modem group, generate a pager alert and log the event". This rule will prevent future incoming and outgoing modem traffic on insecure modems.

Rule 8

This rule states "Move any extension with an unknown modem that has not been successfully penetrated to the Unauthorized Modem group, generate an email, and log the event". This rule will allow future incoming and outgoing data traffic on unauthorized modems that are impenetrable.

Rule 9

This rule states "Move any extension that is not in the All Modems group, on which the "EZ-Crack" software/system has been successfully identified, to the Insecure Modem group, generate a page and log the event". Note that the "!" preceding "All Modems" means "NOT" i.e., NOT All Modems group. This rule will move any unknown modem operating with an unacceptable modem software/system to the Insecure Modem group.

Rule 10

This rule states "Move any extension that is not in the All Modems group, on which the "Tuf-Nut" software/system has been successfully identified, to the Unauthorized Modem group, generate an email and log the event". Note that the"!" preceding "All Modems" means "NOT" i.e., NOT All Modems group. This rule will move any unknown modem operating with an acceptable modem software/system to the Unauthorized Modem group.

Rule 11

This rule states "Move any extension that is not in the All Modems group, on which the attempt to identify the modem software/system has failed, to the Unauthorized Modem group, and log the event". Note that the "!" preceding "All Modems" means "NOT" i.e., NOT All Modems group. This rule will move any unknown modem operating with an unidentified modem software/system to the Unauthorized Modem group.

Security Policy—Security Profile

FIG. 7 illustrates a portion of an exemplary Security Profile, such as the Security Profile 104, for use in connection with the firewall/scanner 10, and as previously mentioned with respect to step 210 in FIG. 3A.

Determining the Security Profile 104 for the firewall/scanner 10 involves creating a set of instruction lines, collectively referred to as a profile, that defines what actions will be associated with scanning the extensions in a particular group 108A–108F. These instruction lines contain attributes such as the name of the specific "Dialer" that will execute the instruction line, the "Group" of extensions or specific telephone numbers to be dialed, the "Time", day and hours for the line to be executed, what devices the Dialer is to "Detect" (fax or modem or both), and the "Assessment" the Dialer will attempt (identify and/or penetrate the software/system controlling the modem). Referring to FIG. 7, an example All Extensions profile 104A is shown for supplementing firewall security by proactively scanning all extensions in an organization to provide a "snap-shot" assessment of where modems exist, to "pre-sort" unknown modems by their software/system, and to perform vulnerability assessments by attempting to penetrate the software/system controlling the modem. In executing the All Extensions profile 104A the Dialer 32 will initially call extensions in the Voice-Only group 108A and then the Fax group 108B, detecting modems that have been installed on the lines. As the Dialer 32 detects a modem, it will attempt to identify the software/system controlling the modem and send the results to the Scanner Management Server 30. The Scanner Management Server 30, in accordance with the Result Response Policy 106, will initiate a page to security administrators, log the event, and/or adjust the Security Policy 100 by moving the previously unknown modem's extension into either the Unauthorized Modem group 108F or the Insecure Modem group 108E, depending on the brand of software/system that has been identified. For instance, if the identified software/system is a product that is well respected by security administrators, the scanner will, in accordance with the Result Response Policy 106, move the extension into the Unauthorized Modem group 108F. If the software/system is a notorious product, the scanner 12 will, in accordance with the Result Response Policy 106, move the extension into the Insecure Modem group 108E.

As execution of the All Extensions profile 104A continues, the Dialer 32 will call and attempt to penetrate the software/system controlling modems on extensions in the All Modems group 108C. The unknown modems previously identified and "pre-sorted" (placed in the Unauthorized Modem group 108F or Insecure Modem group 108E based on their software/system), will also be subjected to penetration attempts since the Unauthorized and Insecure Modem groups are contained within the All Modems group 108C. If the scanner successfully penetrates a modem in the Secure Modem group 108D or Unauthorized Modem group 108F, in accordance with the Result Response Policy, the scanner 12 will send an alert to security administrators, log the event, and/or automatically adjust the Security Policy 100 by moving the extension of the penetrated modem into the Insecure Modem group 108E, thereby denying all future modem traffic to that extension. If the scanner 12 successfully penetrates a modem in the Insecure Modem group 108E, in accordance with the Result Response Policy 106, the scanner will log the event, but no adjustment will be made to the Security Policy and modem traffic will continue to be denied to that extension.

In FIG. 7, Instruction Lines 1–3 are explained as follows:

Line 1

This rule states "Dial all extensions in the Voice-Only group, detect any modems and identify the software/system controlling the modem." The Dialer 32 located in San Antonio will execute the dialing and identification. This rule would be used to find unknown modems on a Voice-Only extension and identify the modem software/system.

Line 2

This rule states "Dial all extensions in the Fax group, detect any modems and identify the software/system controlling the modem." The Dialer 32 located in San Antonio will execute the dialing and identification. This rule would be used to find unknown modems on a Fax extension and identify the modem software/system.

Line 3

This rule states "Dial all extensions in the All Modems group and attempt to penetrate the modems that are on the extensions." The Dialer 32 located in San Antonio will execute the dialing and penetration attempt. This rule would be used to execute vulnerability assessments, verifying the security of all known modems.

Security Policy Adjustment By The Firewall

Figure 8A:
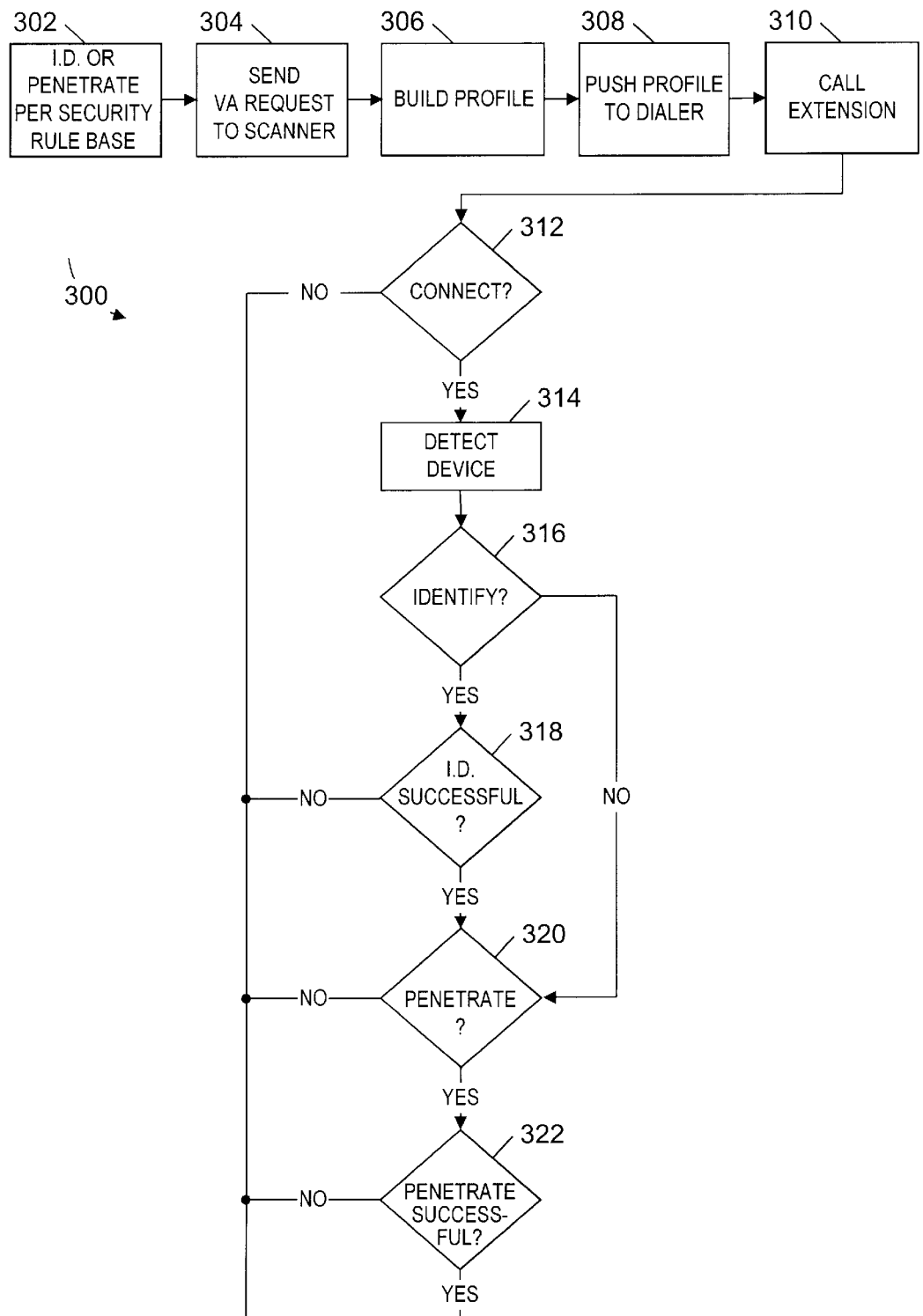
FIGS. 8A and 8B are a process flow diagram illustrating a firewall-initiated scan and Security Policy adjustment.
Figure 8B:
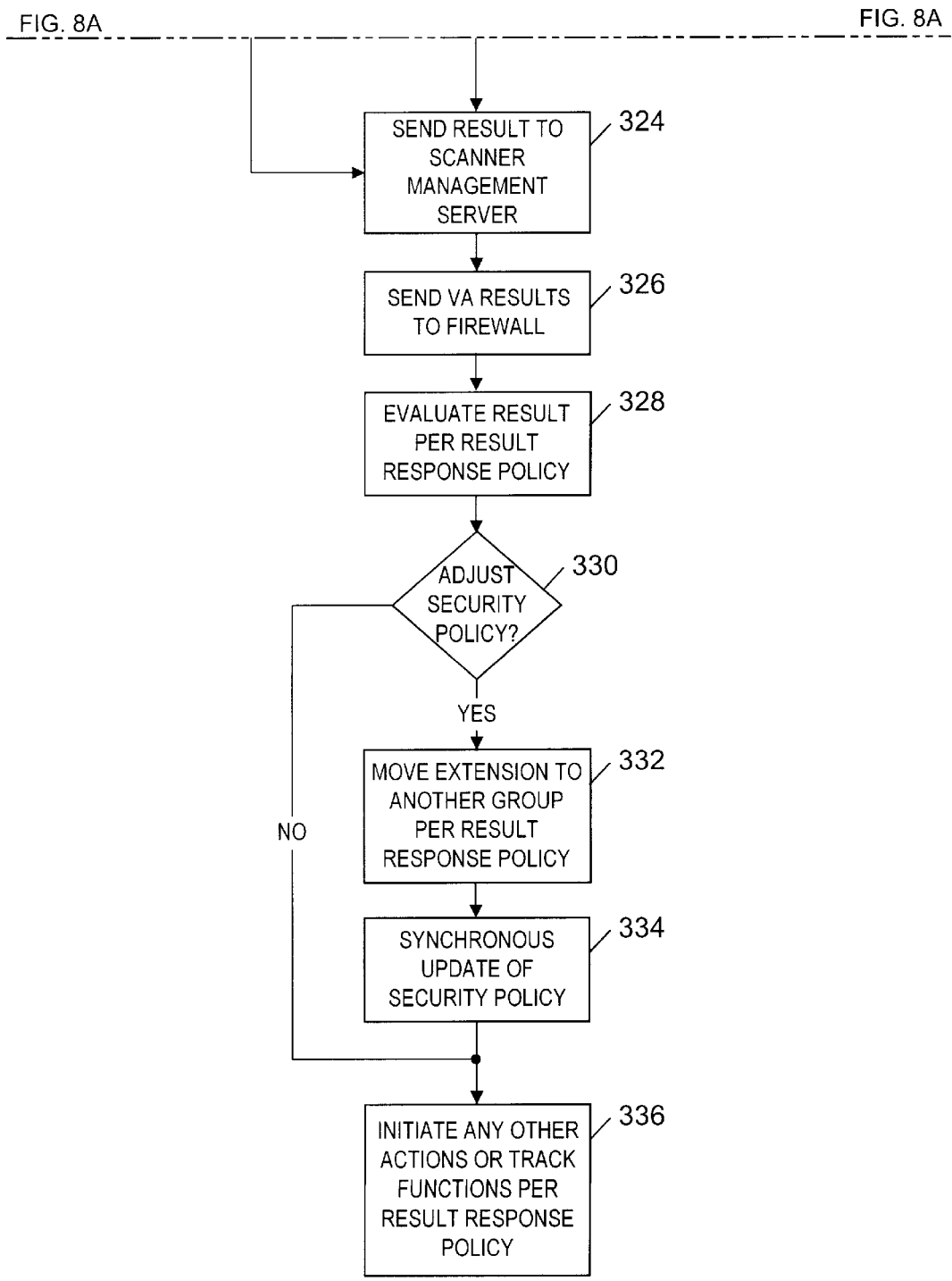

FIGS. 8A and 8B collectively show a process flow diagram 300 illustrating the process whereby the Firewall Management Server 26 initiates a scan to attempt identification and/or penetration, resulting in adjustment to the Security Policy 100. It is understood that the firewall 12 is capable of operating in a continuous loop, detecting and analyzing call activity while simultaneously performing appropriate actions in accordance with the Security Policy 100.

In step 302, an incoming or outgoing call "fires" a rule in the Security Rule Base 102 that dictates that an attempt will be made to identify and/or penetrate the software or operating system controlling a modem. In step 304, the Firewall Management Server 26 sends a VA Request to the Scanner Management Server 30. In step 306, the Scanner Management Server 30 builds a profile from the information contained in the VA Request is executed. In step 308, the Scanner Management Server 30 contacts the Dialer 32, downloading the profile to the Dialer 32.

In steps 310–322 the Dialer 32 executes the profile received from the Scanner Management Server 30. In step 312, a determination is made whether the Dialer 32 has made a connection. If so, execution will proceed to step 314, in which the Dialer 32 will attempt to detect the type of device (fax, modem, or voice) on the extension, and then proceed to step 316. In step 316, a determination is made whether an identification should be performed before a penetration attempt is made. If so, execution proceeds to step 318 in which the Dialer 32 attempts to identify the communications application at the terminating station through signature analysis (i.e., matching negotiation signaling and/or textual banners to known system types). If the identification attempt is successful, execution proceeds to step 320. Alternatively, if in step 316 it is determined that the profile specifies that a penetration attempt be made without identification, execution proceeds directly to step 320. In step 320, a determination is made whether a penetration attempt should be made and if so, execution proceeds to step 322 in which the Dialer 32 will attempt to gain access to the system by using default or system username/passwords and a determination is made whether the penetration result is successful. Execution then proceeds to step 324. Similarly, if a negative determination is made in steps 318 or 320, execution proceeds directly to step 324.

Referring to FIG. 8B, in step 324, the Dialer sends the results of the penetration attempt (VA Results) to the Scanner Management Server 30. In step 326 the Scanner Management Server 30 sends the VA Results to the Firewall Management Server 26. In step 328, the Result Response Policy 106 determines what action the Firewall Management Server 26 will take in response to the VA Results. In step 330, a determination is made whether adjustment of the Security Policy 100 is dictated by the Result Response Policy 106. If so, execution proceeds to step 332, in which the Firewall Management Server 26 will move the extension into a different group, either 108A, 108B, 108C, 108D, 108E, or 108F, and then to step 334, in which the Security Policy 100 used by both the firewall component 12 and the scanner component 14 is synchronously updated. Execution then proceeds to step 336. Similarly, if in step 330 it is determined that adjustment of the Security Policy 100 is not dictated by the Result Response Policy 106, execution proceeds to step 336. In step 336, the Firewall Management Server 26 initiates any other action, such as email or pager notification and event logging dictated by the Result Response Policy 106.

Security Policy Adjustment by the Scanner

Figure 9A:
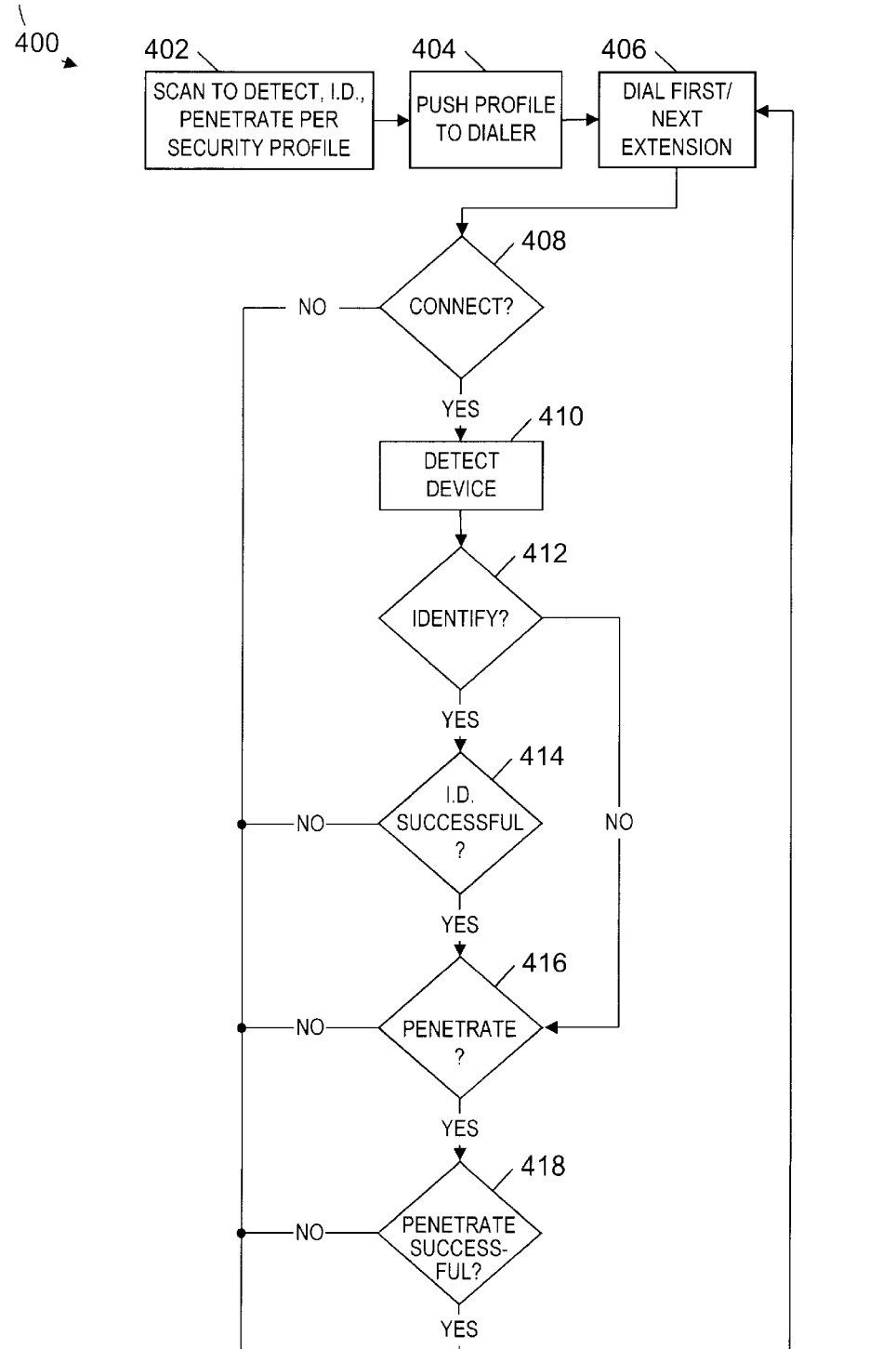
FIGS. 9A and 9B are a flow diagram illustrating a scanner-initiated scan and Security Policy adjustment.
Figure 9B:
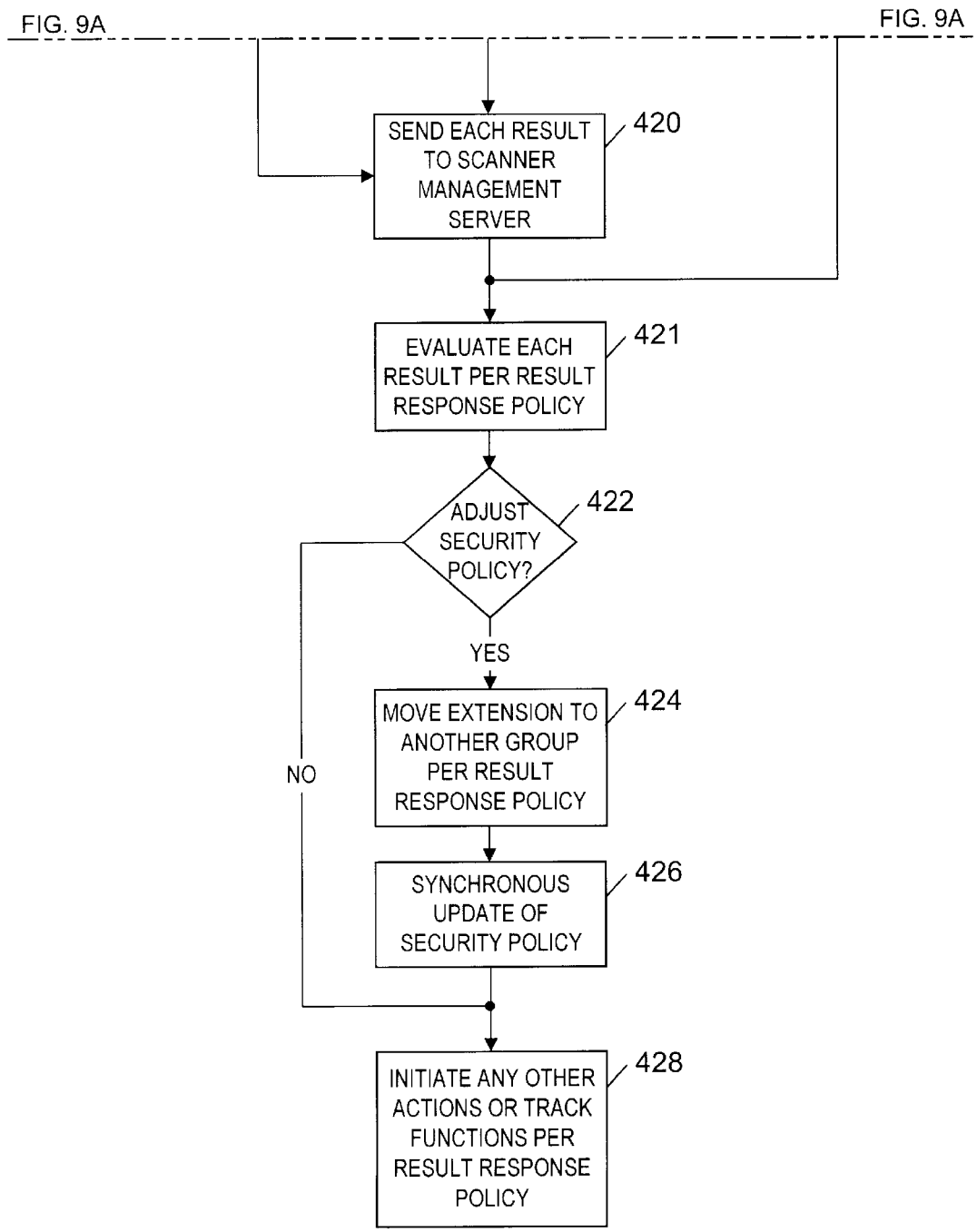

FIGS. 9A and 9B collectively show a process flow diagram 400 illustrating the process whereby the Scanner Management Server 30 initiates a scan to attempt detection or identification and/or penetration, resulting in adjustment to the Security Policy 100. The vulnerability assessment discussed below is different from the assessment described and shown in FIGS. 8A and 8B. The assessment described below is initiated and executed in accordance with the Security Profile 104, contains a plurality of groups to be scanned, and is not in response to a VA Request from the Firewall Management Server 26. It is understood that the scanner 12 is capable of operating in a continuous loop, dialing extensions and performing vulnerability assessments while simultaneously performing appropriate actions in accordance with the Security Policy 100.

In step 402, a scan is initiated by a routinely scheduled profile stored in the Scanner Management Server 30. In step 404, the Scanner Management Server 30 contacts the Dialer 32 and downloads the profile to the Dialer.

In steps 406–418, the Dialer 32 executes the profile received from the Scanner Management Server 30. In step 408, a determination is made whether the Dialer 32 has made a connection. If so, execution will proceed to step 410, in which the Dialer 32 will attempt to detect the type of device (fax, modem, or voice) on the extension, and then to step 412. In step 412, a determination is made whether an identification should be performed before a penetration attempt is made. If so, execution proceeds to step 414 in which the Dialer 32 attempts to identify the communications application at the terminating station through signature analysis (i.e., matching negotiation signaling and/or textual banners to known system types). If the identification attempt is successful, execution proceeds to step 416. Alternatively, if in step 412 it is determined that the profile specifies that a penetration attempt be made without identification, execution proceeds directly to step 416. In step 416, a determination is made whether a penetration attempt should be made and if so, execution proceeds to step 418 in which the Dialer 32 will attempt to gain access to the system by using default or system username/passwords and a determination is made whether the penetration result is successful. Execution then proceeds to step 420. Similarly, if a negative determination is made in steps 414 or 416, execution proceeds directly to step 420.

Referring to FIG. 9B, in step 420, the Dialer 32 sends the results of each detection or identification and/or penetration attempt to the Scanner Management Server 30. In step 421, the Result Response Policy 106 determines what action the Scanner Management Server 30 will take in response to each result on each extension in the profile being executed. In step 422, a determination is made whether adjustment of the Security Policy 100 is dictated by the Result Response Policy 106. If so, execution proceeds to step 424, in which the Scanner Management Server 30 will move the extension into a different group, either 108A, 108B, 108C, 108D, 108E, or 108F, and then to step 426, in which the Security Policy 100 used by both the firewall component 12 and the scanner component 14 is synchronously updated. Execution then proceeds to step 428. Similarly, if in step 422 it is determined that no adjustment to the Security Policy 100 is dictated by the Result Response Policy 106, execution proceeds directly to step 428. In step 428, the Scanner Management Server 30 initiates any other action such as email or pager notification and event logging dictated by the Result Response Policy 106.

Additionally, by developing profiles, such as a No Firewall profile, which would contain all extensions not monitored by a partially deployed firewall component 12, the scanner component 14 of the system 10 can be used in an alternative embodiment to supplement firewall security by continuously scanning the unmonitored extensions, assessing the vulnerability of detected modems and notifying security administrators.

Automatic Call Correlation

In order to enforce extension-based policy rules, it is necessary to know the source and destination telephone numbers/extensions for inbound and outbound calls. The source and destination telephone numbers/extensions for inbound and outbound calls are known when sensors are connected to direct connect lines, as in the case of Line Sensor 18A, or when sensors are connected to lines on the station-side of the PBX 20. When sensors are connected to lines on the trunk side of the PBX 20, for inbound calls, this information may be found on the trunks as Caller ID or Automatic Number Identification ("ANI"), and dialed digits represented as Dual Tone Multi-Frequency ("DTMF") or Multi-Frequency ("MF"). For outbound calls, it is common for PBXs to mask the actual originating number/extension, and send no number or a default number instead. The lack of this information prevents the firewall component 12 of the firewall/scanner 10 from applying rules to inbound and outbound calls when those rules are based upon specific extensions. In these cases, the firewall 12 will use a weighted correlation algorithm and Station Message Detail Recording ("SMDR") or Call Detail Recording ("CDR"), to determine the missing information and enforce the Security Policy 100, as discussed below with reference to FIGS. 10A–10D.

Figure 10A:
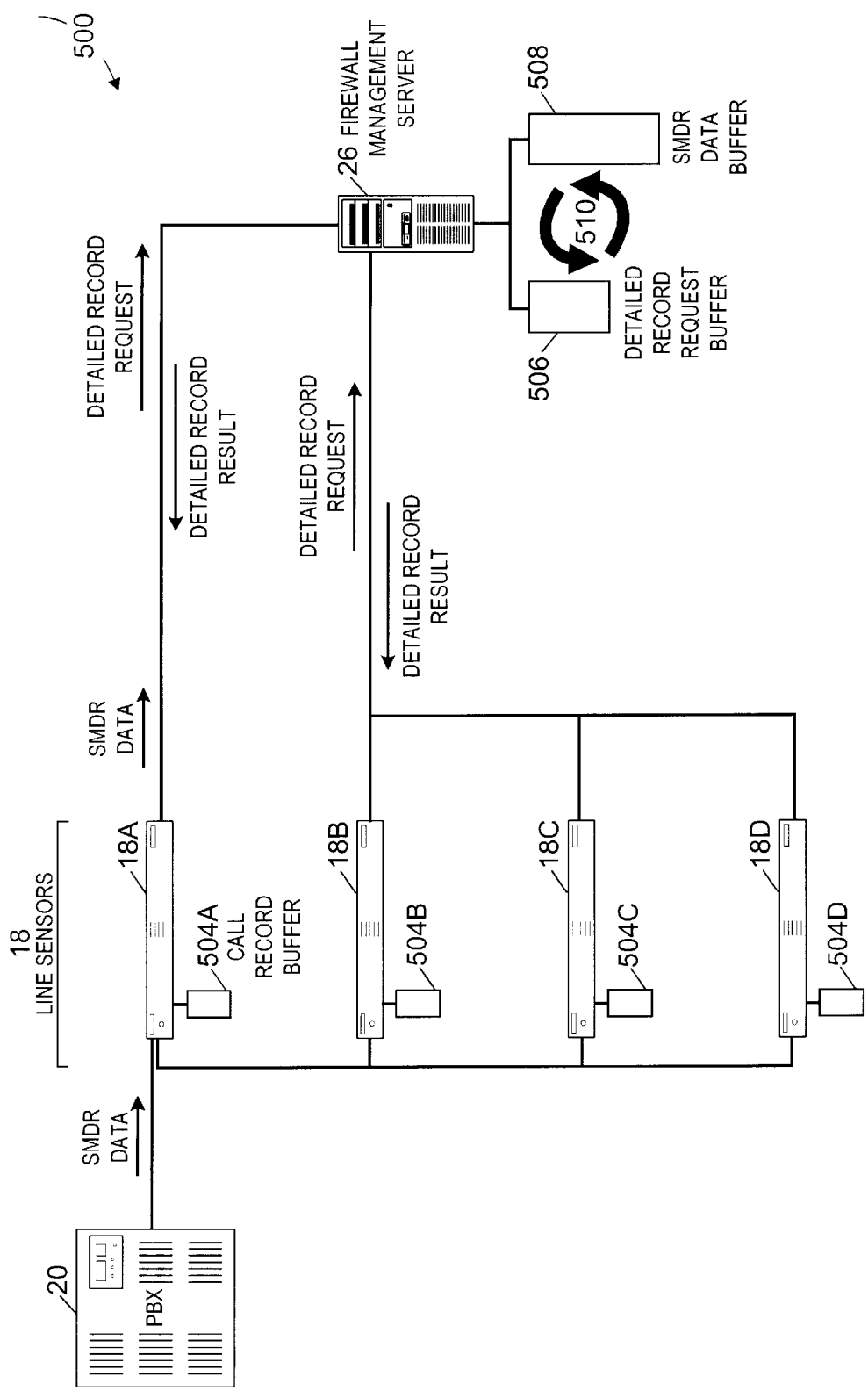
FIG. 10A is a schematic block diagram of the firewall component of the firewall/scanner of FIG. 1 showing the resolution of missing extension information.

FIG. 10A is a schematic block diagram showing the resolution of missing extension information. In one embodiment of the firewall/scanner 10, line sensors 18 represent the plurality of sensors 18A, 18B, 18C, and 18D deployed on the trunks at a single PBX 20 location. Each of the Line Sensors 18A, 18B, 18C, and 18D, includes a call record buffer 504A, 504B, 504C, and 504D, respectively. All of the Line Sensors 18 are connected via an IP Network, and Line Sensor 18A represents the single sensor that receives SMDR data output from the PBX 20. The SMDR data is then routed to the Firewall Management Server 26. The Firewall Management Server 26 maintains the SMDR data within a designated buffer 508. When a Line Sensor 18 sees a call, it will determine the call attributes and create a call event record using those attributes. The attributes in the call event record are compared to the sequential list of rules in the Security Rule Base 102. If the call event record does not have sufficient information, or information deemed to be of sufficient fidelity to "fire" a rule in the Security Rule Base 102, the Line Sensor 18A, 18B, 18C, or 18D will delay execution of policy enforcement on that call, store the call event record in their respective buffer 504A, 504B, 504C, or 504D, and send a Detailed Record Request to the Firewall Management Server 26. All Detailed Record Requests are stored in a designated buffer 506, in the Firewall Management Server 26.

A correlation algorithm 510 compares the contents of the SMDR Data buffer 508 and the Detailed Record Request buffer 506 whenever one of the two buffers receives new data. The correlation algorithm 510 matches the known attributes of the call (contained in the Detailed Record Request and hence the Detailed Record Request buffer 506), to the SMDR data on that call contained in the SMDR Data buffer 508. The Detailed Record Request buffer 506 will typically be a subset of the calls that are contained in the SMDR Data buffer 508, since the SMDR Data buffer receives the records of all calls of interest to the correlation algorithm 510 (i.e., records for internal calls may be omitted).

Because the attributes for an SMDR record vary, the correlation algorithm 510 is weighted to compare start time, source number (if known) or destination number (if known), trunk group, trunk, and channel ID. When the correlation algorithm 510 matches a Detailed Record Request to an SMDR record, the Firewall Management Server 26 will remove the matching Detailed Record Request and the SMDR record from their respective buffers. The Firewall Management Server 26 will send a Detailed Record Response containing the newly identified number/extension to the appropriate Line Sensor 18A, 18B, 18C, or 18D.

The Line Sensor 18A, 18B, 18C, or 18D, will receive the Detailed Record Response and remove the appropriate call record from its Call Record buffer 504A, 504B, 504C, or 504D. The Line Sensor 18A, 18B, 18C, or 18D, will add the previously missing information to the call record, and resume policy enforcement on the call.

Some PBXs output SMDR data in near real-time, while others output the record after the call is complete. If the data is received by the Firewall Management Server 26 in near-real-time, the SMDR records will be correlated with the contents of the Detailed Record Request buffer 506 and the policy will be enforced as soon as possible (in approx. 10 seconds). If the SMDR data is received after the call is complete, it is not possible to terminate the call. In this case, the SMDR data is still correlated with the Detailed Record Request and ensuing actions such as logging the event, generating an email, etc. are carried out in accordance with the Security Policy 100.

Unmatched records remaining in the SMDR Data buffer 508 after a definable period of time are automatically deleted. Similarly, unmatched requests that remain in the Detailed Record Request buffer 506 after a definable period of time are also automatically deleted. Unresolved call records that remain in the Call Record buffer 504A, 504B, 504C, or 504D after a definable period of time will trigger an ambiguous rule notification by the sensor to the Firewall Management Server 26. This notification informs the Firewall Management Server 26 that, for this specific call, it is not possible to execute the Security Policy 100. This notification is logged so security administrators will be made aware that rules may be set up incorrectly, or there may be an issue with the SMDR data coming from the PBX 20.

In the preferred embodiment of this invention, the Line Sensor 18A receiving SMDR records from the PBX will hold the records in a SMDR Data buffer. The Line Sensor 18A will store its own Detailed Record Requests in a Detailed Record Request buffer, as well as Detailed Record Requests sent to it by the other Line Sensors 18B, 18C, 18D. Additionally, the Line Sensor 18A will run the correlation algorithm 510, comparing the contents of the two buffers to provide missing number/extensions. In addition to acting as the central location for correlation of calls, the Line Sensor 18A will carry out all monitoring and enforcement functions of a typical sensor.

In an alternate embodiment, the Line Sensor 18A is dedicated to providing the missing number/extensions, and will not perform the typical monitoring and enforcement functions of the other sensors.

Figure 10B:
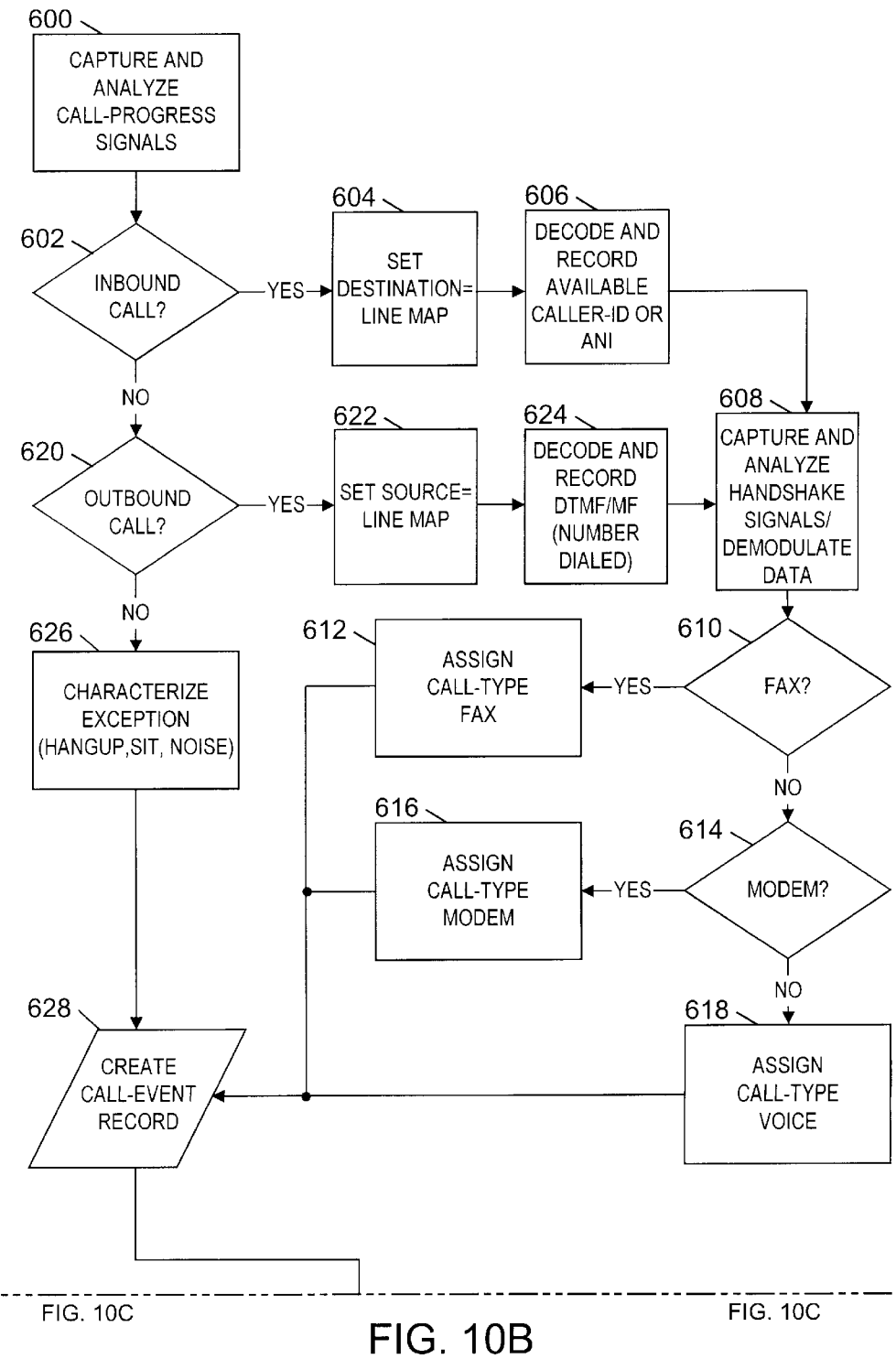
FIGS. 10B–10D are a process flow diagram illustrating detect and analyze call activity, resolution of missing extension information, and execution of policy for the firewall/scanner of FIG. 1.
Figure 10C:
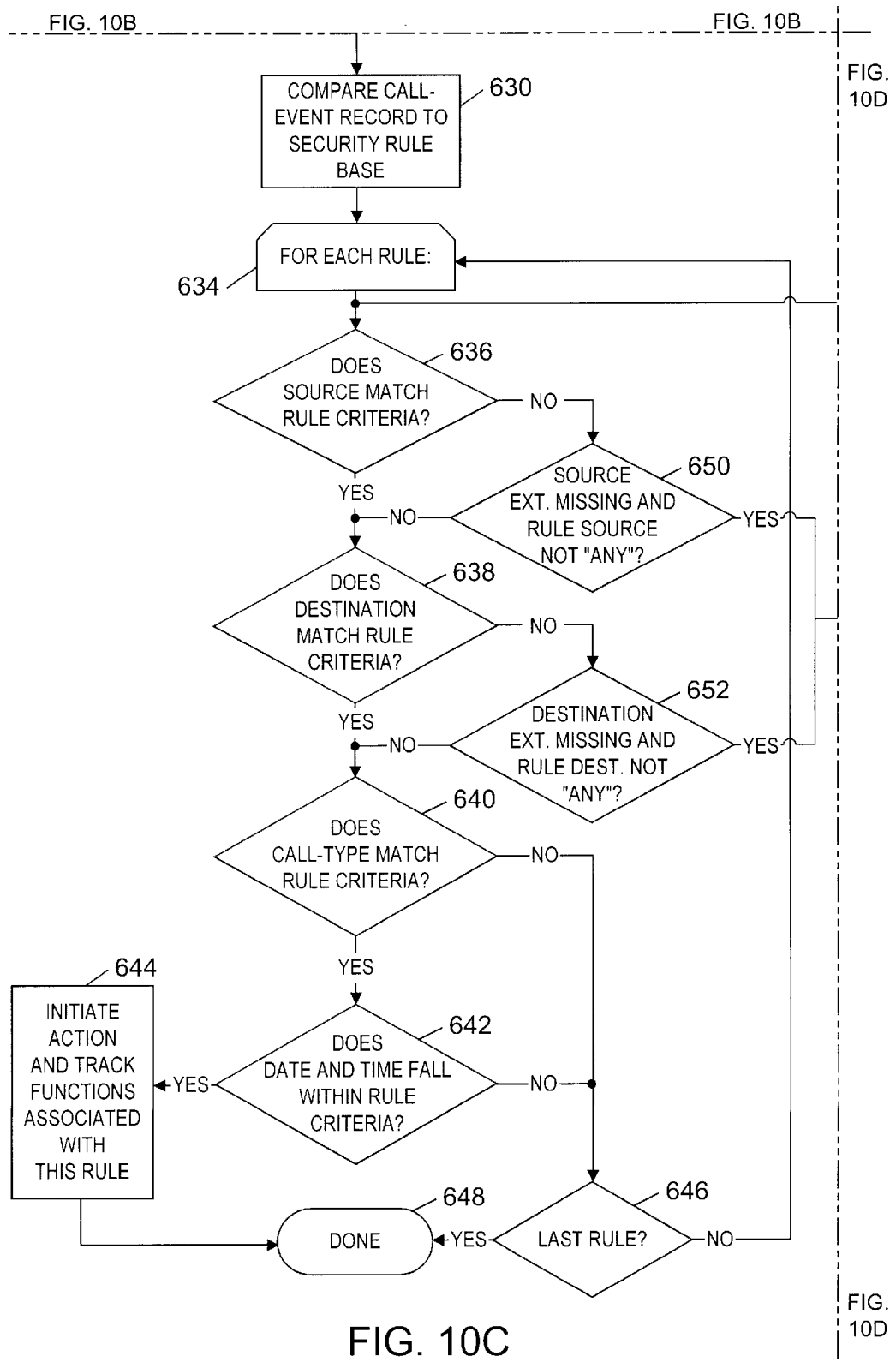
Figure 10D:
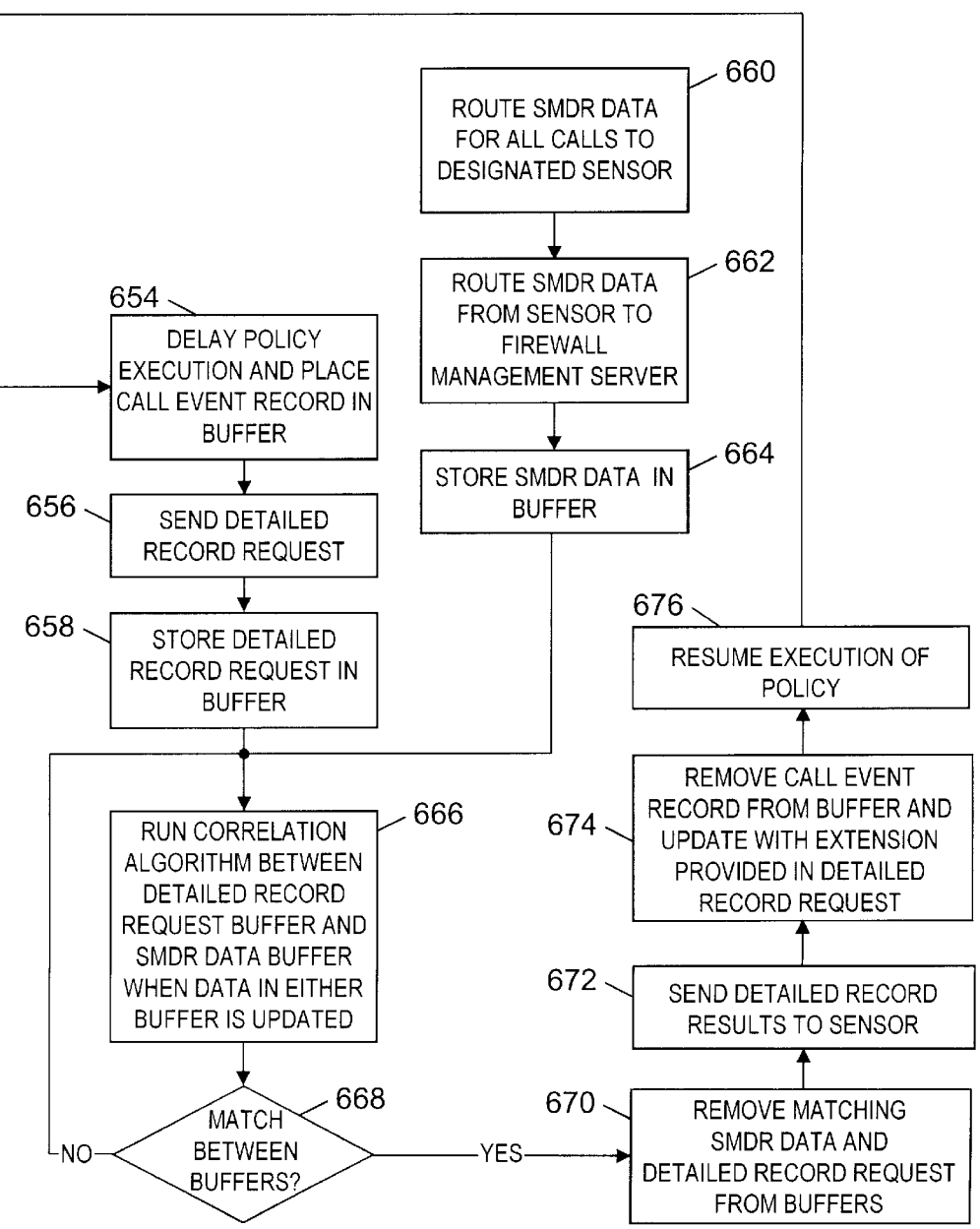

FIGS. 10B–10D are a process flow diagram for detecting and analyzing call activity, determining missing extension information, and implementing the Security Policy 100, as previously mentioned in connection with steps 214–236 in FIGS. 3A and 3B. In FIG. 10B, steps 600–626 illustrate that for each line that is monitored and controlled by the firewall component 12, Line Sensors 18 will capture and analyze all available call attributes. In particular, in step 600, call-progress signals on the line are captured and analyzed. In step 602, a determination is made whether the call is an in-bound call. If so, execution proceeds to step 604, in which the destination is set equal to the line map so that the destination extension can be determined according to the line map. In step 606, the available caller-ID or ANI information is decoded and recorded. In step 608, handshake signals are captured and analyzed and data is demodulated. Execution then proceeds to step 610, in which a determination is made whether the call is to (in the case of inbound calls) or from (in the case of outbound calls) a fax machine. If so, execution proceeds to step 612, in which a call-type of "FAX" is assigned to the call. If a negative determination is made in step 610, execution proceeds to step 614, in which a determination is made whether the call is to (for inbound calls) or from (for outbound calls) a modem. If so, execution proceeds to step 616, in which a call-type of "MODEM" is assigned to the call. If a negative determination is made in step 614, execution proceeds to step 618, in which a call-type of "VOICE" is assigned to the call. Upon completion of any of steps 612, 616, and 618, execution proceeds to step 628, in which a call-event record is created for the call.

Referring again to step 602, if a negative determination is made, execution proceeds to step 620, in which a determination is made whether the call is an outbound call. If so, execution proceeds to step 622, in which the source is set equal to the line map, such that the extension from which the call is made can be identified. In step 624, the DTMF/MF signals are decoded and recorded to determine the number that was dialed. Execution then proceeds to step 608. Via this process, the source number (if known), destination number (if known), trunk group, trunk, channel ID, and call-type attributes for the call are determined, a distinction between fax, modem, and voice call-types is made and "FAX," "MODEM," or "VOICE" call-types are assigned to the call in steps 612, 616, or 618, and all available call attributes are consolidated in a call event record in step 628.

Referring again to step 620, if a negative determination is made, execution proceeds to step 626, in which an exception is characterized, and then to step 628. From step 628, execution proceeds to step 630 (FIG. 10C).

Referring now to FIG. 10C, in step 630, the sensor compares the detected call attributes with rules in the Security Rule Base 102 to execute the Security Policy 100. Steps 634–648 illustrate a process loop that is applied for each rule until an action referenced in step 644, is indicated for the current rule. Rules are evaluated for a call event in sequential order until either one rule meets all attributes in the call event record, or no rules meet the criteria. In particular, in step 636, a determination is made whether the source matches the rule criteria. If so, execution proceeds to step 638, in which a determination is made whether the destination matches the rule criteria. If so, execution proceeds to step 640, in which a determination is made whether the call-type matches the rule criteria. If so, execution proceeds to step 642, in which a determination is made whether the date and time fall within the rule criteria. If so, execution proceeds to step 644, in which the action and track functions associated with the rule are initiated. Execution terminates in step 648.

Referring again to step 636, if the source does not match the rule criteria, execution proceeds to step 650, in which a process loop is initiated for resolving missing extension information if the call event record does not contain the source extension, and the rule being considered for execution does not have a source of "ANY", (i.e., the rule applies to a specific extension or Group 108, hence requiring the call source be known in order to fire the rule). Specifically, in step 650, a determination is made whether the source extension is missing and the rule source is not "ANY". If not, execution proceeds to step 638; otherwise, execution proceeds to step 654 (FIG. 10D). Referring again to step 638, if it is determined that the destination does not match the rule criteria, execution proceeds to step 652, in which a process loop is initiated for the resolution of missing extension information if the call event record does not contain the destination extension, and the rule being considered for execution does not have a destination of "ANY", (i.e., the rule applies to a specific extension or Group 108 hence requiring the call destination be known in order to fire the rule). Specifically, in step 652, a determination is made whether the destination extension is missing and the rule destination is not "ANY". If not, execution proceeds to step 640; otherwise, execution proceeds to step 654. Referring again to steps 640 and 642, if a negative determination is made in either of these steps, execution proceeds to step 646, in which a determination is made whether the current rule is the last rule to be evaluated. If not, execution returns to step 634 and the next rule is retrieved; otherwise, execution terminates in step 648.

Referring now to FIG. 10D, steps 654–664 illustrate to two processes by which two buffers in the Firewall Management Server 26 are populated for use in determining missing extension information. Steps 654–658 illustrate the process of the Line Sensor 18A, 18B, 18C, or 18D delaying execution of the Security Rule Base 102, moving the call event record to the sensor's Call Record buffer 504A, 504B, 504C, or 504D, and sending a Detailed Record Request to the Firewall Manager Server's Detailed Record Request buffer 506. Steps 660–664 illustrate the process by which the SMDR data for all calls are routed from the PBX 20, through a single Line Sensor 18A, into the SMDR Data buffer 508 in the Firewall Management Server 26.

Steps 666 and 668 illustrate the process of the correlation algorithm 510 comparing the data in the Detailed Record Request buffer 506 against the data in the SMDR Data buffer 508, looking for matches between the contents of the two buffers (step 666). In step 668, a determination is made whether a match has been found. If not, execution returns to step 666 and the correlation algorithm 510 will be run again when one of the two buffers receives new data; otherwise, execution proceeds to step 670. Steps 670–674 illustrate the process of Firewall Management Server 26 removing the matching Detailed Record Request and SMDR data from the buffers (step 670), the sensor receiving the missing extension information in a Detailed Record Result (step 672), and the sensor using the information to update the call event record (step 674). In step 676, the sensor resumes the execution of the Security Policy 100 by applying the call attributes in the updated call event record with rules in the Security Rule Base until an action is indicated for the current rule, as indicated in step 644.

Distributed Deployment

Figure 11:
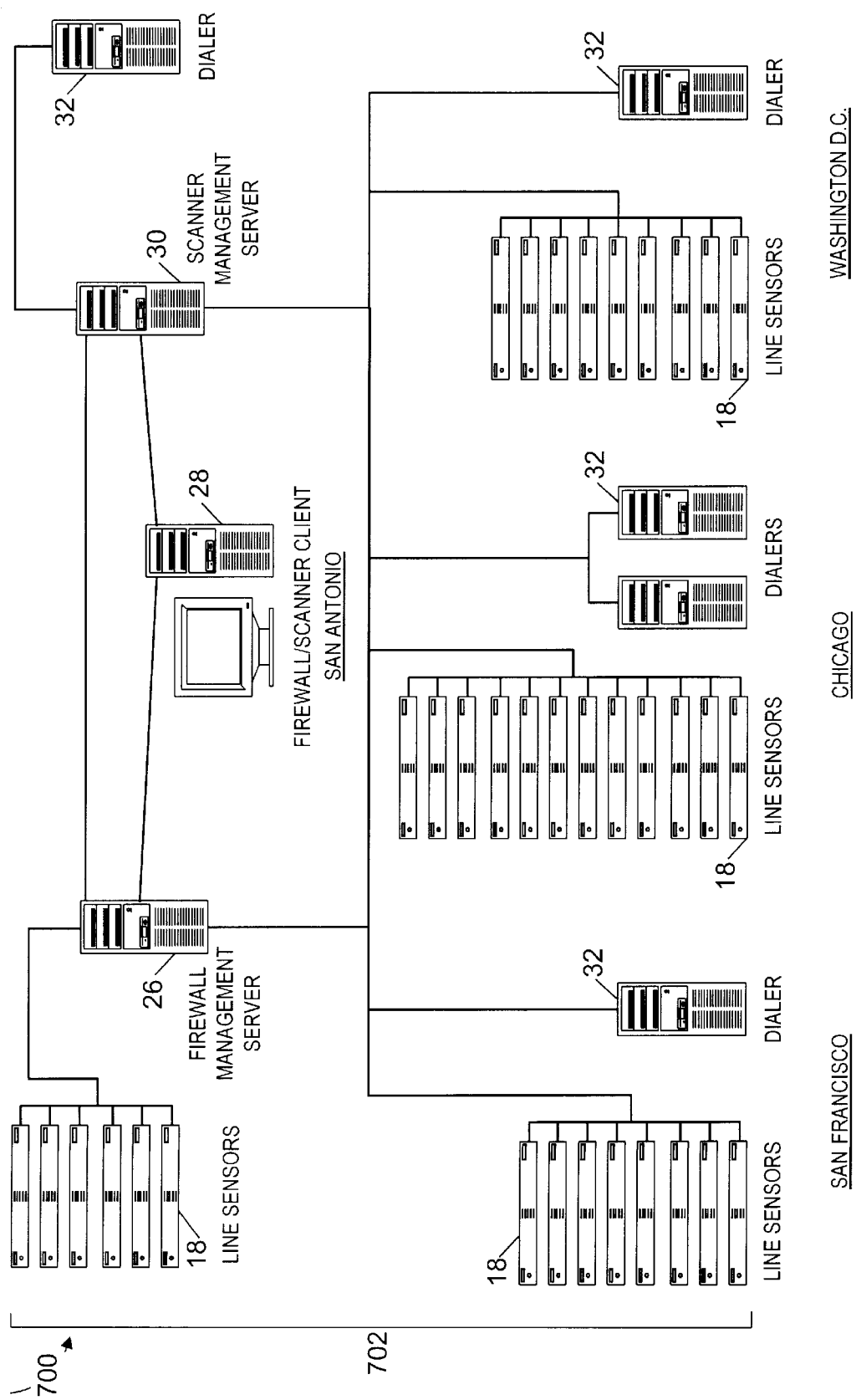
FIG. 11 is a schematic block diagram illustrating an exemplary distributed deployment of the firewall/scanner of FIG. 1 as an alternative implementation of the present invention.

In FIG. 11, reference numeral 700 designates an alternative embodiment of the firewall/scanner 10 of FIG. 1 featuring a distributed deployment thereof. Due to their distributed nature, many companies are challenged to enforce a telecommunications security policy across their organization. The firewall/scanner 700 enables a distributed organization to limit duplication of effort and ensure consistent application of a security policy across multiple locations. Although security systems are necessarily distributed, policy can be dictated centrally. This requires an organization to control security devices in a top-down fashion. In order to assess the company-wide security posture, detailed visibility into the entire organizational data stream is provided by collection at the device level, reporting up the management chain, consolidating multiple reports at the Firewall Management Server 26 for viewing, report filtering/configuration, and printing at the Firewall/Scanner Client 28.

The firewall/scanner 700 depicted in FIG. 11 supports distribution of a plurality of Line Sensors 18 and Dialers 32 in remote locations, all controlled and managed via TCP/IP 702 connections (e.g., over internal LANs, private WANs, or even over the Internet). With this type of configuration, a geographically separated organization can leverage security expertise in one central location by consolidating the security events and assessment results of the distributed Line Sensors 18 and Dialers 32 with the responses of the Firewall Management Server 26 and the Scanner Management Server 28, all on one Firewall/Scanner Client 28.

Multi-Tiered Policy-Based Enforcement of a Security Policy

Figure 12A:
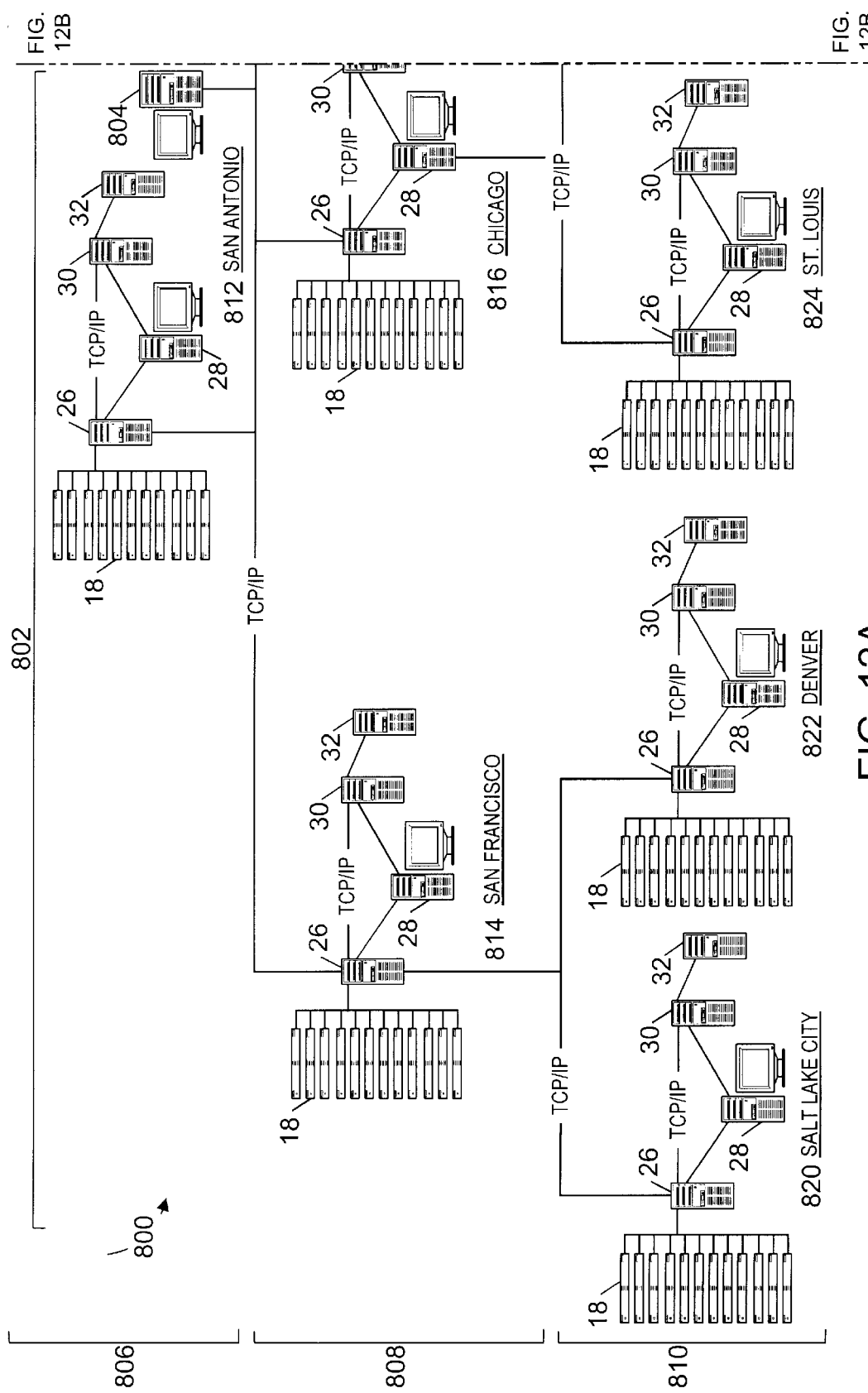
FIGS. 12A and 12B are a schematic block diagram illustrating a system for implementing a multi-tiered policy-based enforcement of a Security Policy across a large, globally distributed enterprise.
Figure 12B:
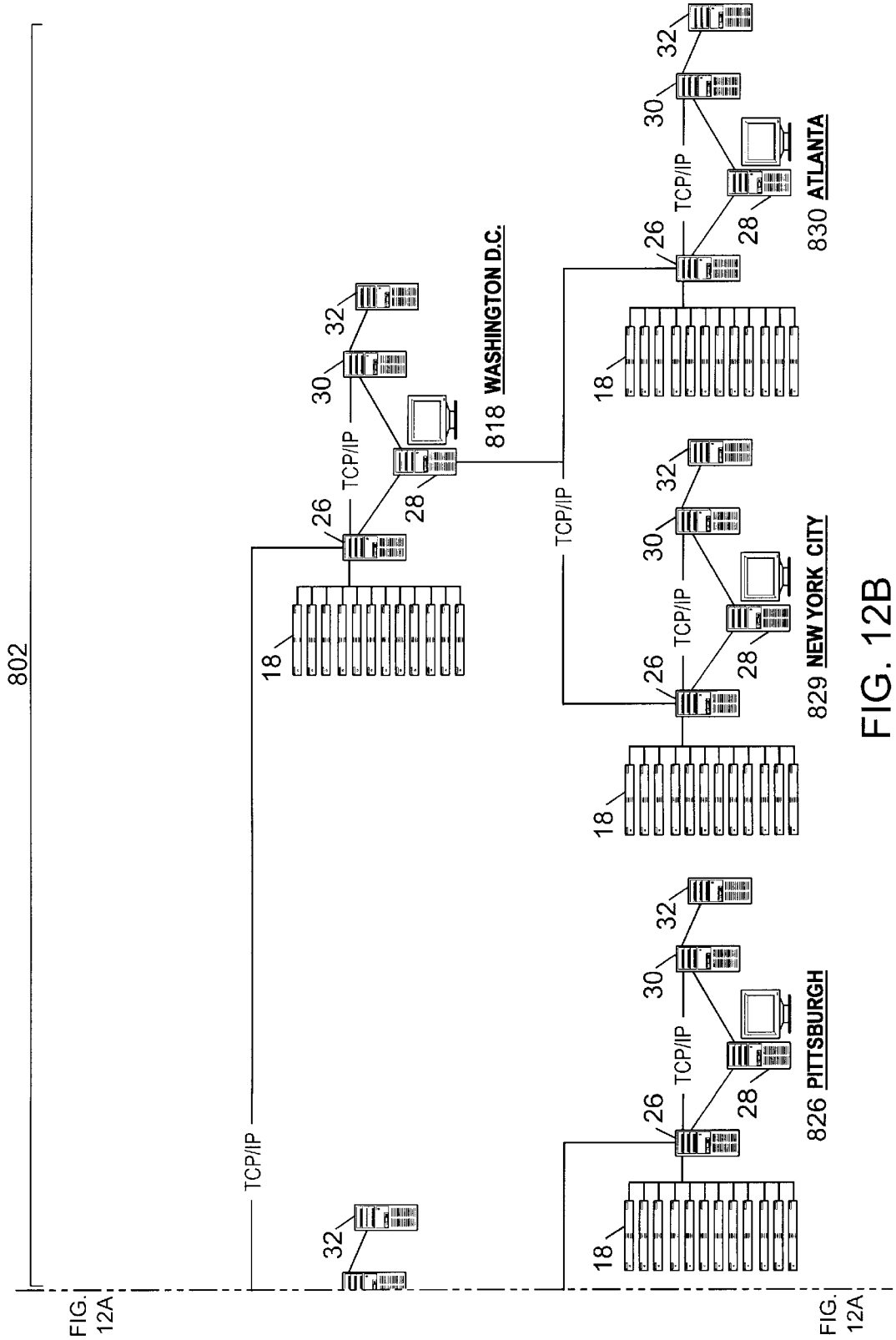

FIGS. 12A and 12B show a schematic block diagram 800 illustrating a system and method of multi-tiered policy-based enforcement of a Security Policy 100 across a large, globally distributed enterprise.

The method of distributed deployment previously discussed and illustrated in FIG. 11 is applicable for a small- to medium-sized distributed organization, but processing all the security events from the hundreds of Line Sensors 18 that would be deployed in a medium- to large-sized globally distributed enterprise would quickly overload a lone Firewall Management Server 26. Additionally, a single Firewall Management Server 26 would not provide the remote locations with a degree of control over, or visibility into, their own security status.

As illustrated in FIGS. 12A and 12B, a Firewall Management Server 26 installed at each location (such as San Antonio 812, San Francisco 814, Chicago 816, Washington D.C. 818, Salt Lake City 820, Denver 822, St. Louis 824, Pittsburgh 826, New York City 828, and Atlanta 830), will divide traffic load and allow management and implementation of the security policy on a more localized basis. Unfortunately, deployment of multiple independent firewalls makes it difficult to ensure the same basic security structure across the enterprise. Additionally, consolidation of local logging information to provide visibility into important local security events at the highest corporate level is difficult and labor-intensive.

A multi-tiered policy-based enforcement of the Security Policy within a distributed architecture ensures implementation of a basic, enterprise-wide security policy with a degree of localized policy control, as well as automatic security event log consolidation and visibility into important local security events at the highest corporate level.

As shown in FIGS. 12A and 12B, within a multi-tiered management environment, a "corporate" level 806 Management Server 804 oversees its own local Firewall Management Server 26 at San Antonio 812 as well as multiple "regional" level 808 Firewall Management Servers 26 at San Francisco 814, Chicago 816, and Washington D.C. 818. These "regional" Firewall Management Servers oversee multiple "branch" level 810 Firewall Management Servers 26 at Salt Lake City 820, Denver 822, St. Louis 824, Pittsburgh 826, New York City 828, and Atlanta 830. Each Firewall Management Server 26 within the multi-tiered environment 800 enforces the Security Policy for its local Line Sensors 18, and in accordance with the Firewall Management Server tier position, may also oversee Firewall Management Servers below it. Each location is connected via TCP/IP 802 connections (e.g., over internal LANs, private WANs, or even over the Internet). For the purpose of simplification, the examples will pertain to the "corporate" level 806 Management Server 804 in San Antonio 812 overseeing the "regional" level 808 Firewall Management Server 26 in San Francisco 814, which will oversee the "branch" level 810 Firewall Management Server 26 in Salt Lake City 820 and the "branch" level 810 Firewall Management Server 26 in Denver 822.

Just as a CEO imparts guidelines of conduct to his VPs, who in turn impart fundamentally similar guidelines to their Directors, so does the "corporate" level 806 Management Server 804 define a basic security policy to the "regional" level 808 Firewall Management Server 26 in San Francisco 814, that in turn disseminates a fundamentally similar security policy to the "branch" level 810 Firewall Management Server 26 at Salt Lake City 820 and Denver 822.

The corporate-dictated security policy will contain basic rules for the Security Rule Base 102. These rules are classified as either "Required" or "Optional". Each level of the hierarchical environment must adhere to a required rule, but can choose to ignore optional rules. Each level of the tier is capable of making their local rules and the rules for the tiers below it more stringent than the corporate-dictated rules, but can not make the rules more lax. In this way, a basic security structure is ensured across the enterprise.

The corporate-dictated security policy will contain basic Security Rule Base 102 rules that dictate what information will be reported upward, thereby providing visibility into only the most important local security events at the corporate level. Just as the corporate-dictated rules send security guidelines that may become more stringent as they are passed downward, the policy institutes an information filter that becomes more selective as email, logs and reports, etc., are routed upward. The tasks in the "Tracks" column of the corporate-dictated rule (such as email notification, pager notification, logging of events, etc.), that are of interest at a local level but are not of interest at higher levels, are designated to be filtered out if notification of a rule firing is to be routed up the tier to the Management Server 804. All logging is real-time, both at the location where the event occurs and at upper levels of the organization that, in accordance with the security policy, may or may not require notification of the event.

FIGS. 12C and 12D illustrate rules in an exemplary Security Rule Base 102, for use in implementing a multi-tiered policy-based enforcement of a Security Policy 100. As previously mentioned with respect to step 208 in FIG. 3A, and the Security Rule Base 102 shown in FIGS. 5A and 5B, rules are based upon the call attributes of "Source," "Destination," "Call-type," "Date," and "Time," a sensor deployment location "Install On," and will initiate an "Action," and will initiate "Track," a notification, logging, and vulnerability assessment, etc. As shown in FIGS. 12C and 12D, when implementing multi-tier policy-based enforcement, the attributes of the rules are expanded to include "Class," a classification of adherence to a rule as either "Required" or "Optional" or "Local". Any rule that is not a corporate-dictated rule will be designated as a local rule. If notification of a rule "firing" is to be routed up the tier to the Management Server 804, "Route" will appear in the "Track" column, dictating that when a Firewall Management Server 26 is notified by a subordinate Firewall Management Server 26 that a rule has fired, the notification will be routed upward to the next higher-tiered Firewall Management Server 26. Additionally, if notification of a rule "firing" is to be routed upward, tasks listed in the "Track" column are designated to be filtered (F), if execution of the task should take place only at the location where the rule originally fired and the Line Sensor 18 notified the Firewall Management Server 26. By filtering the tasks in the "Track" column, the policy will designate which tasks, such as event logging will be performed at each level of the tier, when a rule "fires" at a subordinate level of the tier.

Rules 1–13, are explained as follows, it being understood that the Security Rule Base 102 for multi-tiered policy-based enforcement of the Security Policy shown in FIGS. 12C and 12D may include any number and types of rules, and that each rule is evaluated in sequential order, exiting after any one rule matches the call criteria.

Rule 1

This rule states "Deny all calls to the extensions in the Dialer Modem group at any time, on any day; route notification of the rule firing to the supervisory Firewall Management Server; generate a page, a real-time alert, and log the call". Adherence to this rule is required. Since this rule might be used to alert security personnel to potential hacking attempts, it is of interest to the upper echelon. As notification of the rule "firing" is made at each upper level of the hierarchy, the event will be logged, but the task of real-time alert and page will be filtered out. Note that (F) designates that the tasks of generating a page and real-time alert will be filtered out. Generation of a page and real-time alert will be performed only at the location where the Line Sensor 18 notifies the Firewall Management Server 26 that the rule has "fired".

Rule 2

This rule states "Allow all calls from the extensions in the Dialer Modem group at any time, on any day, and log the call". Adherence to this rule is required. It makes sense to avoid generating false alarms while scanning the extensions of the organization, but since the execution of this rule is not an alert to potential hacking attempts or security violations, upper levels of the tier will not be notified that this rule has "fired". Note that this lack of upward notification is indicated by an absence of "Route" in the "Track" column.

Rule 3

This rule states "Allow all outbound modem traffic from the extensions in the Secure Modem group at any time, on any day, and log the call". Adherence to this rule is required. Since this rule will allow business as usual, upper levels of the tier will not be notified that this rule has "fired".

Rule 4

This rule states "Allow all incoming modem traffic to the extensions in the Secure Modem group at any time, on any day, and log the call". Adherence to this rule is required. Since this rule will allow business as usual, upper levels of the tier will not be notified that this rule has "fired".

Rule 5

This rule states "Deny all outbound modem traffic from the extensions in the Insecure Modem group at any time, on any day; route notification of the rule firing to the supervisory Firewall Management Server; generate an email notification, and log the call". Adherence to this rule is required. Since the firing of this rule is an indication of the security posture, it is of interest to the upper echelon. As notification of the rule "firing" is made at each upper level of the hierarchy, the event will be logged, but the task of email notification will be filtered out. Generation of an email notification will take place only at the location where the Line Sensor 18 notified the Firewall Management Server 26 that the rule has "fired".

Rule 6

This rule states "Deny all incoming modem traffic to the extensions in the Insecure Modem group at any time, on any day; route notification of the rule firing to the supervisory Firewall Management Server; generate an email notification, and log the call". Adherence to this rule is required. Since the firing of this rule is an indication of the security posture, it is of interest to the upper echelon. As notification of the rule "firing" is made at each upper level of the hierarchy, the event will be logged, but the task of email notification will be filtered out. Generation of an email notification will take place only at the location where the Line Sensor 18 notified the Firewall Management Server 26 that the rule has "fired".

Rule 7

This rule states "Allow all outbound modem traffic from the extensions in the Unauthorized Modem group at any time, on any day; route notification of the rule firing to the supervisory Firewall Management Server; generate an email notification, and log the call". Adherence to this rule is required. Since the firing of this rule is an indication of the security posture, it is of interest to the upper echelon. As notification of the rule "firing" is made at each upper level of the hierarchy, the event will be logged, but the task of email notification will be filtered out. Generation of an email notification will take place only at the location where the Line Sensor 18 notified the Firewall Management Server 26 that the rule has "fired".

Rule 8

This rule states "Allow all incoming modem traffic to the extensions in the Unauthorized Modem group at any time, on any day; route notification of the rule firing to the supervisory Firewall Management Server; generate an email notification, and log the call". Adherence to this rule is required. Since the firing of this rule is an indication of the security posture, it is of interest to the upper echelon. As notification of the rule "firing" is made at each upper level of the hierarchy, the event will be logged, but the task of email notification will be filtered out. Generation of an email notification will take place only at the location where the Line Sensor 18 notified the Firewall Management Server 26 that the rule has "fired".

Rule 9

This rule states "Deny all modem traffic from/to any extension at any time on any day; route notification of the rule firing to the supervisory Firewall Management Server; attempt to penetrate the modem and log the call". Adherence to this rule is required. This rule prevents all modem calls to and from unknown modems, and will initiate a penetration attempt on the software/system operating the modem. The firing of this rule is an indication of the security posture, and of interest to the upper echelon. As notification of the rule "firing" is made at each upper level of the hierarchy, the event will be logged, but the task of penetration will be filtered out. The penetration attempt will take place only at the location where the Line Sensor 18 notified the Firewall Management Server 26 that the rule has "fired".

Rule 10

This rule states "Deny all outgoing voice traffic from the extensions in the Fax group at any time, on any day, generate an email and log the call". Adherence to this rule is optional. Since this rule prevents outgoing voice calls on an extension dedicated for fax use, it is more of a local management issue than a network security event, therefore the rule is recommended for identifying such occurrences, but not required. Additionally, upper echelons will not be notified that this rule has fired. Note that this lack of upward notification is indicated by an absence of "Route" in the "Track" column.

Rule 11

This rule states "Allow all outbound voice calls from the extensions in the Voice-Only group at any time, on any day, and the call will be logged locally". Adherence to this rule is optional. Since this rule will allow business as usual, upper levels of the tier will not be notified that this rule has "fired". Note that this lack of upward notification is indicated by an absence of "Route" in the "Track" column.

Rule 12

This rule states "Allow all incoming voice calls to the extensions in the Voice-Only group at any time, on any day, and log the call". Adherence to this rule is optional. Since this rule will allow business as usual, upper levels of the tier will not be notified that this rule has "fired". Note that this lack of upward notification is indicated by an absence of "Route" in the "Track" column.

Rule 13

This catchall rule states "Deny all calls from anywhere to anywhere at any time of any day; route notification of the rule firing to the supervisory Firewall Management Server; and log the call". Adherence to this rule is required. Since this rule is typically placed at the bottom of the sequential list of rules to deny and log all calls that do not fit into any of the preceding rules, the firing of the rule is an indication of the security posture, and of interest to the upper echelon. As notification of the rule "firing" is made at each upper level of the hierarchy, the event will be logged at that level.

Figure 12E:
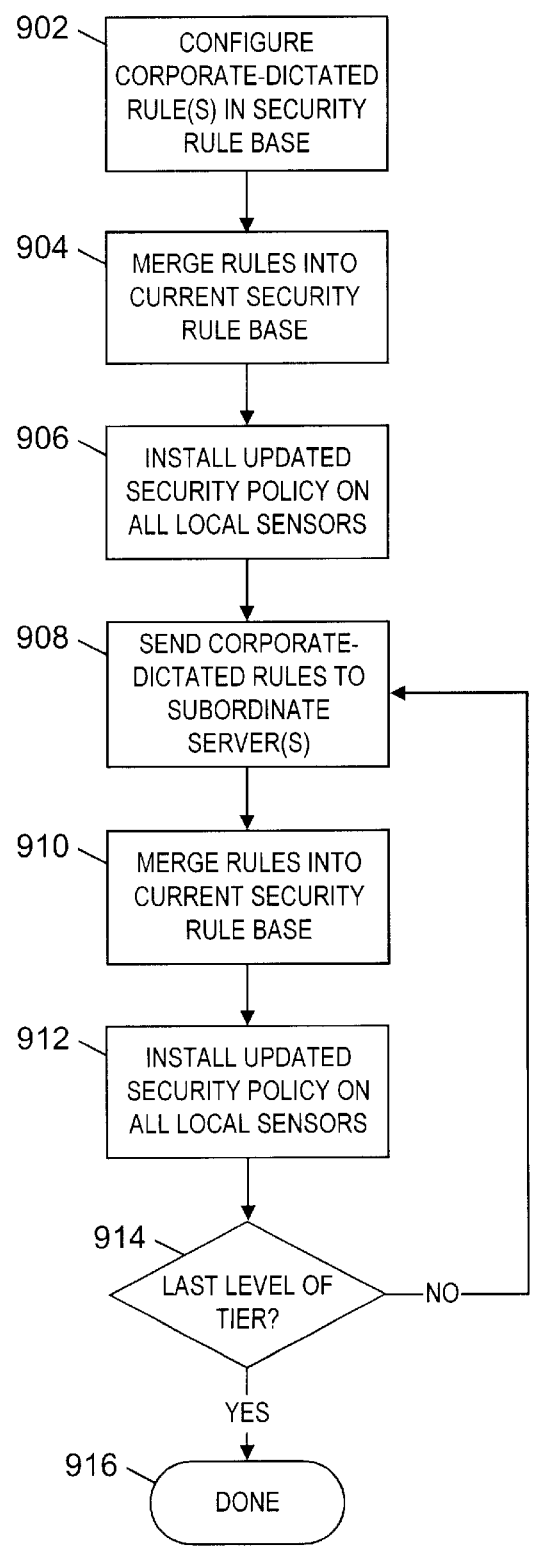
FIG. 12E is a process flow diagram illustrating the implementation of the system of FIGS. 12A and 12B.

FIG. 12E is a process flow diagram 900 illustrating the implementation of a multi-tiered policy-enforcement of the Security Policy. It is understood that this process can be implemented during step 208 of the installation, configuration and operation process discussed previously in FIGS. 3A and 3B, or at any time afterward, since the corporate-dictated rules will have priority over and remove any conflicting local rule.

Referring to FIG. 12E, in step 902, corporate-dictated rules, similar to those described previously with reference to FIGS. 12C and 12D, that will comprise the basic security policy to be distributed downward from the "corporate" level 806 to each "regional" level 808 Firewall Management Server 26 (such as the one in San Francisco 814), and to each "branch" level 810 Firewall Management Server 26 (such as those in Salt Lake City 820 and Denver 822), are defined. In step 904 the corporate-dictated rules are merged into the current Security Rule Base 102 of the Security Policy 100. As mentioned previously, the corporate-dictated rules will have priority over and remove any conflicting rules. In step 906, the updated Security Policy 100 is downloaded to the local Line Sensors 18 on the "corporate" level 806.

Steps 908–914 illustrate a recursive process by which the updated Security Policy 100 is downloaded to each Firewall Management Server 26 and its Line Sensors 18 on each level 808 and 810 of the tier, until the process has been performed on the lowest level of the tier. In particular, in step 908, the updated Security Policy 100 is sent to the Firewall Management Server 26 on the "regional" level 808 in San Francisco 814. In step 910, the new corporate-dictated rules are merged with the currently existing rules in the San Francisco 814 Firewall Management Server 26. In step 912, the updated Security Policy 100 is downloaded to the local Line Sensors 18 of the San Francisco 814 Firewall Management Server 26. In step 914, a determination is made whether the current level (in this case, the San Francisco 814 Firewall Management Server 26) is the last level of the tier or whether it has supervisory responsibilities of other Firewall Management Servers 26, such as those on the "branch" level 810. If it is determined that the current level is not the last level of the tier (i.e., the current Firewall Management Server 26 has supervisory responsibilities), execution returns to step 908 and steps 908–912 will be repeated, as will be the case for the dissemination of the new Security Policy to the Firewall Management Servers 26 in Salt Lake City 820 and Denver 822. If a positive determination is made in step 914, i.e., when the corporate-dictated rules have been disseminated to the Firewall Management Servers 26 and the Line Sensors 18 populating each level of the tier, the process is complete and execution terminates in step 916.

It should be understood that the rules comprising this basic security structure can be modified and sent down the tier at any time. While the corporate-dictated rules can be modified completely at the "corporate" level 806 and pushed downward, the security administrators on other levels, such as the "regional" level 808, can only accept the rules as is or make the rules to be sent downward to the "branch" level more stringent.

Figure 12F:
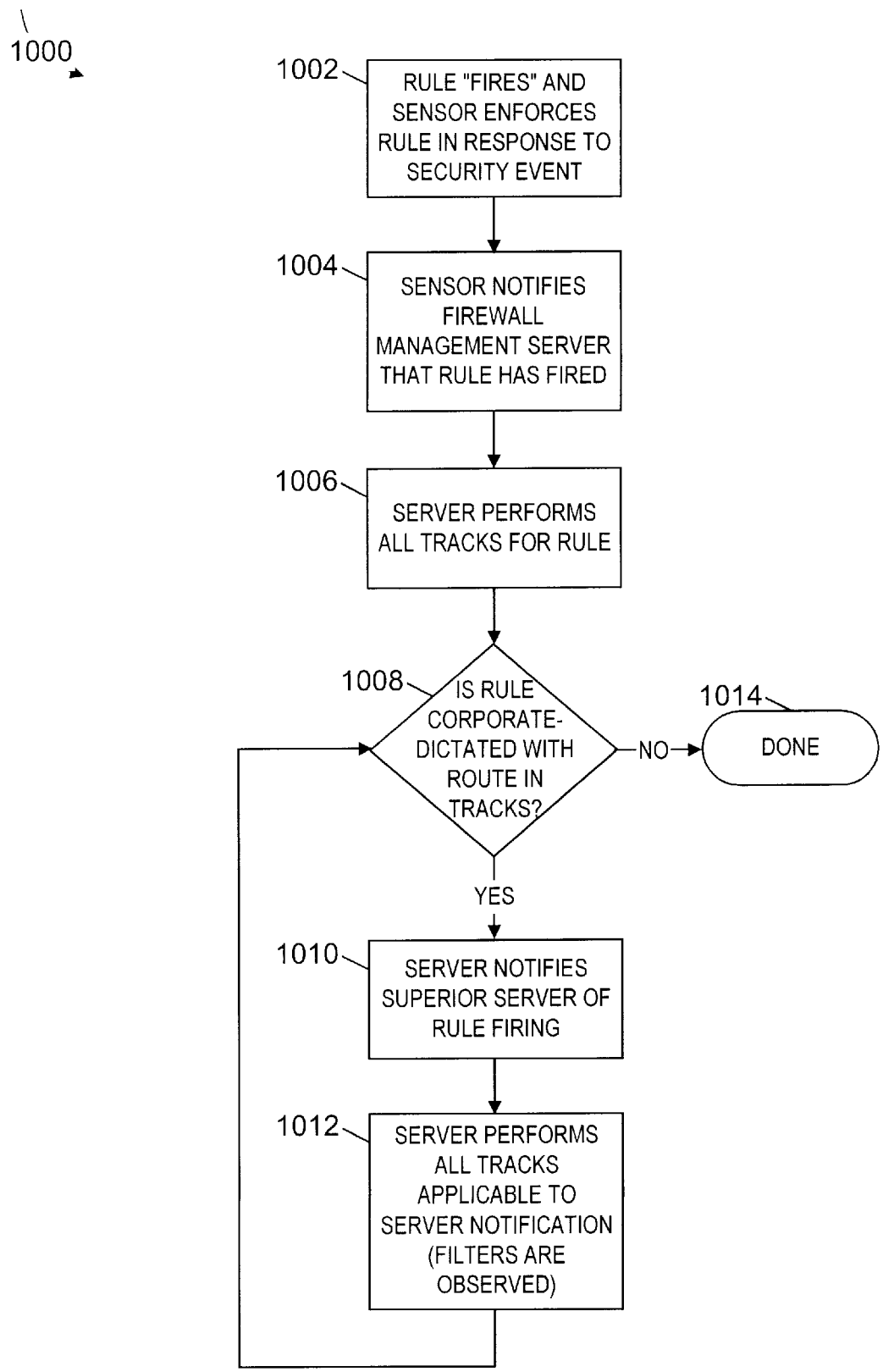
FIG. 12F is a process flow diagram illustrating the implementation of filtering on logging and execution of other "Track" tasks in the system of FIGS. 12A and 12B.

FIG. 12F is a process flow diagram 1000 illustrating the implementation of filtering on logging and execution of other "Track" tasks in a multi-tiered policy-enforced environment. It is understood that this filtering process can be applied to any task that may occur in the "Track" column of the Security Rule Base 102 for execution during step 224, 226, and/or 236 of the operation process discussed previously in FIGS. 3A and 3B.

Referring to FIG. 12F, in step 1002 a Line Sensor 18 will evaluates the attributes of a call (source, destination, type of call, etc.), against the sequential list of rules in the Security Rule Base 102 contained within the Security Policy 100. When an applicable rule is found, the rule "fires" and the Line Sensor will enforce the rule. In step 1004, the Line Sensor 18 notifies the Firewall Management Server 26 that the specific rule has been matched or "fired" and that the rule has been enforced. In step 1006, the Firewall Management Server 26, in accordance with the rule in the Security Rule Base, automatically executes the tasks designated in the "Track" column of the rule, such as generating an email notification and logging the event.

Steps 1008–1012 illustrate a recursive process by which the Firewall Management Server 26 on each level of the multi-tiered hierarchy receives notification of the rule having been fired, executes "Track" tasks for the rule, and notifies its supervisory Firewall Management Server 26 that the rule has "fired", until the notification reaches the top level of the tier. In particular, in step 1008, the rule is evaluated to determine if it is a corporate-dictated rule, and if notification of the rule "firing" will be routed up the tier in accordance with the "Route" task in the "Track" column. If the notification of the rule firing is to be routed upward, execution proceeds to step 1010, in which the Firewall Management Server 26 will send a notification of the rule firing to its supervisory Firewall Management Server 26. Execution then proceeds to step 1012, in which, upon receiving notification routed from a subordinate Firewall Management Server 26 that a rule has fired, the supervisory Firewall Management Server will execute all "Track" tasks in the rule, such as logging that are not filtered, and then route a notification of the rule firing to its supervisory Firewall Management Server. Execution then returns to step 1008. This recursive process will continue until the notification and logging reach the "corporate" level 806 Management Server 804 which will consolidate all logging and reports for the enterprise. Referring again to step 1008, if a negative determination is made, execution terminates in step 1014.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. An integrated telephony firewall and scanner system for controlling and logging access between an enterprise's end-user stations and their respective circuits into a public switched telephone network ("PSTN") via a plurality of extensions, the system comprising means for defining a security policy including a security rule base, a results response policy and groups of extensions, wherein the security rule base includes security rules specifying actions to be taken based upon at least one attribute of a call on an extension, the results response policy includes results response rules specifying actions to be taken bases on results of a vulnerability assessment ("VA").

2. The system of claim 1 wherein the means for updating the security policy comprises means for updating the security policy by moving the extension from a first one of the groups of extensions to a second one of the groups of extension.

3. The system of claim 1 wherein the groups of extensions include an voice-only group comprising extensions designated exclusively for voice calls, a secure modem group comprising extensions having connected thereto modems that have been deemed authorized and secure, an insecure modem group comprising extensions having connected thereto modems that have been deemed insecure, and an unauthorized modem group comprising extensions having connected thereto modems that have not been deemed insecure, but that are not authorized.

4. The system of claim 1 wherein the means for performing a VA on the extension comprises means for attempting to penetrate a modem connected to the extension.

5. The system of claim 4 wherein the VA results indicate whether or not the penetration attempt was successful.

6. The system of claim 1 further comprising means responsive to the VA request for building a profile, the profile defining the type of VA to be performed.

7. The system of claim 1 wherein the VA results indicate that the penetration attempt was successful and the updating the security policy comprises moving the extension from a first group to an insecure modem group.

8. The system of claim 1 wherein the results response rules specify actions selected from the group consisting of update the security policy, log the VA results, and notify a designated person of the VA results.

9. The system of claim 1 wherein the at least one call attribute is the call-type and wherein the security rules specify the actions of permitting or denying a call.

10. The system of claim 1 wherein the at least one call attribute is selected from the group consisting of call-type, call date, call time, call duration, station extension, inbound number, and outbound number dialed.

11. The system of claim 1 wherein security rules specify actions selected from the group consisting of permit or deny the call, redirect the call, log the call, and notify a designated person.

12. The method of claim 1 comprising designating each of the security rules of the second tier security policy as being either required or optional, wherein all of the rules designated as being required in the first tier security policy and a portion of the subset of the rules of the first tier security policy are designated in the second tier security policy as being required and the remainder of the subset of the rules of the first tier security policy are designated in the second tier security policy as being optional.

13. The method of claim 12 further comprising:
defining in connection with a third FMS connected to the second tier FMS a third tier security policy comprising security rules specifying actions to be taken based upon at least one attribute of a call on an extension connected to the third tier FMS via a line sensor; and
performing actions on a selected call on the extension connected to the third tier FMS based upon at least one attribute thereof, in accordance with the security rules of the third tier security policy;
wherein the third tier security policy includes all of the rules of the second tier security policy designated as being required and a subset of the rules of the second tier security policy designated as being optional.

14. The method of claim 13 further comprising designating each of the security rules of the third tier security policy as being either required or optional and wherein all of the rules designated as being required in the second tier security policy and a portion of the subset of the rules of the second tier security policy are designated in the third tier security policy as being required and the remainder of the subset of the rules of the second tier security policy are designated in the third tier security policy as being optional.

15. The method of claim 13 wherein the first, second, and third FMSes are located in locations remote from one another and are connected to one another via TCP/IP connections.

16. A method of implementing an integrated telephony firewall and scanner system for controlling and logging access between an enterprise's end-user stations and their respective circuits into a public switched telephone network ("PSTN") via a plurality of extensions, the method comprising:
defining a security policy comprising a security rule base, a results response policy, and groups of extensions, wherein the security rule base includes security rules specifying actions to be taken based upon at least one attribute of a call on an extension, the results response policy includes results response rules specifying actions to be taken based on results of a vulnerability assessment ("VA") performed on an extension, and the groups of extensions each include a set of extensions having at least one feature in common;
detecting a call on an extension to determine attributes associated with the call wherein the detecting the call is accomplished between the extension and the PSTN;
performing actions based upon the call attributes in accordance with the security rules defined for the extension;
requesting a VA on the extension;
performing a VA on the extension and generating VA results responsive to the VA request; and
updating the security policy based on the VA results in accordance with the results response policy.

17. The method of claim 16 wherein the updating the security policy comprises updating the security policy by moving the extension from a first one of the groups of extensions to a second one of the groups of extension.

18. The method of claim 16 wherein the groups of extensions include an voice-only group comprising extensions designated exclusively for voice calls, a secure modem group comprising extensions having connected thereto modems that have been deemed authorized and secure, an insecure modem group comprising extensions having connected thereto modems that have been deemed insecure, and an unauthorized modem group comprising extensions having connected thereto modems that have not been deemed insecure, but that are not authorized.

19. The method of claim 16 wherein the performing a VA on the extension comprises attempting to penetrate a modem connected to the extension.

20. The method of claim 19 wherein the VA results indicate whether or not the penetration attempt was successful.

21. The method of claim 16 further comprising building a profile responsive to the VA request, the profile defining the type of VA to be performed.

22. The method of claim 16 wherein the VA results indicate that the penetration attempt was successful and the updating the security policy comprises moving the extension from a first group to an insecure modem group.

23. The method of claim 16 wherein the results response rules specify actions selected from the group consisting of update the security policy, log the VA results, and notify a designated person of the VA results.

24. The method of claim 16 wherein the at least one call attribute is the call-type and wherein the security rules specify the actions of permitting or denying a call.

25. The method of claim 16 wherein the at least one call attribute is selected from the group consisting of call-type, call date, call time, call duration, station extension, inbound number, and outbound number dialed.

26. The method of claim 16 wherein security rules specify actions selected from the group consisting of permit or deny the call, redirect the call, log the call, and notify a designated person.

27. An integrated telephony firewall and scanner system for controlling and logging access between an enterprise's end-user stations and their respective circuits into a public switched telephone network ("PSTN") via a plurality of extensions, the system comprising:
  a firewall/scanner client for defining a security policy comprising a security rule base, a results response policy, and groups of extensions, wherein the security rule base includes security rules specifying actions to be taken based upon at least one attribute of a call on an extension, the results response policy includes results response rules specifying actions to be taked based on results of a vulnerability assessment ("VA") performed on an extension, and the groups of extensions each include a set of extensions having at least one feature in common;
  a line sensor connected to said firewall/scanner client via a firewall management server for detecting a call on an extension to determine attributes associated with the call, performing actions based upon the call attributes in accordance with the security rules defined for the extension, and notifying the firewall management server that the actions have been performed, responsive to which notification the firewall management server requests a VA on the extension and wherein the line sensor is located between the extension and the PSTN;
  a scanner management server for receiving the VA request and, responsive to the VA request, building a profile and pushing the profile to a dialer for performing a VA on the extension and generating VA results to the firewall management server;
  wherein the firewall management server updates the security policy based on the VA results in accordance with the results response policy.

28. The system of claim 27 wherein the firewall management server updates the security policy by moving the extension from a first one of the groups of extensions to a second one of the groups of extension.

29. The system of claim 27 wherein the groups of extensions include an voice-only group comprising extensions designated exclusively for voice calls, a secure modem group comprising extensions having connected thereto modems that have been deemed authorized and secure, an insecure modem group comprising extensions having connected thereto modems that have been deemed insecure, and an unauthorized modem group comprising extensions having connected thereto modems that have not been deemed insecure, but that are not authorized.

30. The system of claim 27 wherein the dialer performs a VA on the extension by attempting to detect, identify, and penetrate a modem connected to the extension.

31. The system of claim 30 wherein the VA results indicate whether or not the penetration attempt was successful.

32. The system of claim 27 wherein the VA results indicate that the penetration attempt was successful and the updating the security policy comprises moving the extension from a first group to an insecure modem group.

33. The system of claim 27 wherein the results response rules specify actions selected from the group consisting of update the security policy, log the VA results, and notify a designated person of the VA results.

34. The system of claim 27 wherein the at least one call attribute is the call-type and wherein the security rules specify the actions of permitting or denying a call.

35. The system of claim 27 wherein the at least one call attribute is selected from the group consisting of call-type, call date, call time, call duration, station extension, inbound number, and outbound number dialed.

36. The system of claim 27 wherein security rules specify actions selected from the group consisting of permit or deny the call, redirect the call, log the call, and notify a designated person.

37. An integrated telephony firewall and scanner system for controlling and tracking access between an enterprise's end-user stations and their respective circuits into a public switched telephone network ("PSTN") via a plurality of extensions, the system comprising:
  means for defining a security policy comprising a security rule base, a results response policy, and groups of extensions, wherein the security rule base includes security rules specifying actions to be taken based upon at least one attribute of a call on an extension, the results response policy includes results response rules specifying actions to be taken based on results of a vulnerability assessment ("VA") performed on an extension, and the groups of extensions each include a set of extensions having at least one feature in common;
  means for detecting a call on an extension to determine attributes associated with the call;
  means for performing actions based upon the call attributes in accordance with the security rules defined for the extension;
  means for requesting a VA on the extension;
  means responsive to the VA request for performing a VA on the extension and generating VA results; and
  means for performing actions based upon the VA results in accordance with the results response rules defined for the extension.

38. The system of claim 37 wherein the means for performing actions based on the VA results includes means for notifying a designated person of the VA results.

39. The system of claim 37 wherein the means for performing actions based on the VA results includes means for logging an event in connection with the call.

40. A method of implementing an integrated telephony firewall and scanner system for controlling and logging access between an enterprise's end-user stations and their respective circuits into a public switched telephone network ("PSTN") via a plurality of extensions, the method comprising:
  defining a security policy comprising a security rule base, a results response policy, and groups of extensions, wherein the security rule base includes security rules specifying actions to be taken based upon at least one attribute of a call on an extension, the results response policy includes results response rules specifying actions to be taken based on results of a vulnerability assessment ("VA") performed on an extension, and the groups of extensions each include a set of extensions having at least one feature in common;

detecting a call on an extension to determine attributes associated with the call;

performing actions based upon the call attributes in accordance with the security rules defined for the extension;

requesting a VA on the extension;

performing a VA on the extension and generating VA results responsive to the VA request; and performing actions based upon the VA results in accordance with the results response rules defined for the extension.

41. The method of claim 40 wherein the performing actions based on the VA results includes notifying a designated person of the VA results.

42. The method of claim 40 wherein the performing actions based on the VA results includes logging an event.

43. An integrated telephony firewall and scanner system for controlling and logging access between an enterprise's end-user stations and their respective circuits into a public switched telephone network ("PSTN") via a plurality of extensions, the system comprising:

a firewall/scanner client for defining a security policy comprising a security rule base, a results response policy, and groups of extensions, wherein the security rule base includes security rules specifying actions to be taken based upon at least one attribute of a call on an extension, the results response policy includes results response rules specifying actions to be taken based on results of a vulnerability assessment ("VA") performed on an extension, and the groups of extensions each include a set of extensions having at least one feature in common;

a line sensor connected to said firewall/scanner client via a firewall management server for detecting a call on an extension to determine attributes associated with the call, performing actions based upon the call attributes in accordance with the security rules defined for the extension, and notifying the firewall management server that the actions have been performed, responsive to which notification the firewall management server requests a VA on the extension;

a scanner management server for receiving the VA request and, responsive to the VA request, building a profile and pushing the profile to a dialer for performing a VA on the extension and generating VA results to the firewall management server;

wherein the firewall management server initiates actions based upon the VA results in accordance with the results response rules defined for the extension.

44. The system of claim 43 wherein the actions initiated by the firewall management server include notifying a designated person of the VA results.

45. The system of claim 43 wherein the actions initiated by the firewall management server include logging an event in connection with the call.

46. An integrated telephony firewall and scanner system for controlling and tracking access between an enterprise's end-user stations and their respective circuits into a public switched telephone network ("PSTN") via a plurality of extensions, the system comprising:

means for defining a security policy comprising a security rule base, a results response policy, and groups of extensions, wherein the security rule base includes security rules specifying actions to be taken based upon at least one attribute of a call on an extension, the results response policy includes results response rules specifying actions to be taken based on results of a vulnerability assessment ("VA") performed on an extension, and the groups of extensions each include a set of extensions having at least one feature in common;

means for detecting a call on an extension to determine attributes associated with the call;

means for performing a VA on the extension and generating VA results; and means for performing actions based upon the VA results in accordance with the results response rules defined for the extension.

47. The system of claim 46 wherein the means for performing actions based on the VA results includes means for notifying a designated person of the VA results.

48. The system of claim 46 wherein the means for performing actions based on the VA results includes means for logging an event in connection with the call.

49. The system of claim 46 wherein the means for performing actions based on the VA results includes means for updating the security policy as specified by the results response rules defined for the extension.

50. A method of implementing an integrated telephony firewall and scanner system for controlling and logging access between an enterprise's end-user stations and their respective Circuits into a public switched telephone network ("PSTN") via a plurality of extensions, the method comprising:

defining a security policy comprising a security rule base, a results response policy, and groups of extensions, wherein the security rule base includes security rules specifying actions to be taken based upon at least one attribute of a call on an extension, the results response policy includes results response rules specifying actions to be taken based on results of a vulnerability assessment ("VA") performed on an extension, and the groups of extensions each include a set of extensions having at least one feature in common;

detecting a call on an extension to determine attributes associated with the call;

performing a VA on the extension and generating VA results responsive to the VA request;

performing actions based upon the VA results in accordance with the results response rules defined for the extension.

51. The method of claim 50 wherein the performing actions based on the VA results includes notifying a designated person of the VA results.

52. The method of claim 50 wherein the performing actions based on the VA results includes logging an event in connection with the call.

53. The method of claim 50 wherein the performing actions based on the VA results includes updating the security policy as specified by the results response rules defined for the extension.

54. An integrated telephony firewall and scanner system for controlling and logging access between an enterprise's end-user stations and their respective circuits into a public switched telephone network ("PSTN") via a plurality of extensions, the system comprising:

a firewall/scanner client for defining a security policy comprising a security rule base, a results response policy, and groups of extensions, wherein the security rule base includes security rules specifying actions to be taken based upon at least one attribute of a call on an extension, the results response policy includes results response rules specifying actions to be taken based on results of a vulnerability assessment ("VA") performed on an extension, and the groups of extensions each include a set of extensions having at least one feature in common;

a line sensor connected to said firewall/scanner client via a firewall management server for detecting a call on an extension to determine attributes associated with the call;

a scanner management server for pushing a profile including the extension to a dialer for performing a VA on the extension and generating VA results to the firewall management server;

wherein the firewall management server initiates actions based upon the VA results in accordance with the results response rules defined for the extension.

55. The system of claim 54 wherein the initiating actions based on the VA results includes notifying a designated person of the VA results.

56. The system of claim 54 wherein the initiating actions based on the VA results includes logging an event in connection with the call.

57. The system of claim 54 wherein the initiating actions based on the VA results includes updating the security policy as specified by the results response rules defined for the extension.

58. The system of claim 54 wherein the scanner management server builds the profile including the extension in response to a VA request from the firewall management server.

59. The system of claim 54 wherein the profile is a routinely scheduled profile stored in the scanner management server.

60. The system of claim 54 wherein the line sensor includes a plurality of line sensors.

61. The system of claim 54 wherein the dialer includes a plurality of dialers.

62. The system of claim 54 wherein the line sensor and the dialer are disposed in a location remote from said firewall/scanner client.

63. The system of claim 54 wherein the line sensor and the dialer are connected to the firewall management server and the scanner management server via TCP/IP connections.

64. A multi-tier telephony security system for controlling and logging access between an enterprise's end-user stations at a plurality of customer sites and their respective circuits into a public switched telephone network (PSTN) via a plurality of extensions, the system comprising:

a first tier firewall management server ("FMS"), the first tier FMS including a database containing a first tier security policy comprising security rules specifying actions to be taken based upon at least one attribute of a call on an extension;

a line sensor within a customer site connected to the first tier FMS for performing actions on a selected call based upon at least one attribute thereof, in accordance with the security rules of the first tier security policy;

a second tier FMS connected to the first tier FMS, the second tier FMS including a database containing a second tier security policy comprising security rules specifying actions to be taken based upon at least one attribute of a call on an extension;

a line sensor within the customer sites connected to the second tier FMS for performing actions on a selected call based upon at least one attribute thereof, in accordance with the security rules of the second tier security policy;

wherein each of the security rules of the first tier security policy are designated as being either required or optional; and wherein the second tier security policy includes all of the rules of the first tier security policy designated as being required and a subset of the rules of the first tier security policy designated as being optional.

65. The system of claim 64 wherein each of the security rules of the second tier security policy are designated as being either required or optional and wherein all of the rules designated as being required in the first tier security policy and a portion of the subset of the rules of the first tier security policy are designated in the second tier security policy as being required and the remainder of the subset of the rules of the first tier security policy are designated in the second tier security policy as being optional.

66. The system of claim 65 further comprising:

a third tier FMS connected to the second tier FMS, the third tier FMS including a database containing a third tier security policy comprising security rules specifying actions to be taken based upon at least one attribute of a call on an extension; and a line sensor within customer sites connected to the third tier FMS for performing actions on a selected call based upon at least one attribute thereof, in accordance with the security rules of the third tier security policy;

wherein the third tier security policy includes all of the rules of the second tier security policy designated as being required and a subset of the rules of the second tier security policy designated as being optional.

67. The system of claim 66 wherein each of the security rules of the third tier security policy are designated as being either required or optional and wherein all of the rules designated as being required in the second tier security policy and a portion of the subset of the rules of the second tier security policy are designated in the third tier security policy as being required and the remainder of the subset of the rules of the second tier security policy are designated in the third tier security policy as being optional.

68. The system of claim 66 wherein the first, second, and third FMSes are located in locations remote from one another and are connected to one another via TCP/IP connections.

69. The system of claim 64 wherein the first and second PMSes are located in locations remote from one another and are connected to one another via at least one TCP/IP connection.

70. A method of implementing multi-tier telephony security system for controlling and logging access between an enterprise's end-user stations at a plurality of customer sites and their respective circuits into a public switched telephone network (PSTN) via a plurality of extensions, the method comprising:

defining in connection with a first tier firewall management server ("FMS") a first tier security policy comprising security rules specifying actions to be taken based upon at least one attribute of a call on an extension connected to said first tier FMS via a line sensor;

performing actions on a selected call on the extension connected to the first tier FMS based upon at least one attribute thereof, in accordance with the security rules of the first tier security policy;

defining in connection with a second tier FMS connected to the first tier FMS a second tier security policy comprising security rules specifying actions to be taken based upon at least one attribute of a call on an extension connected to said second tier FMS via a line sensor;

performing actions on a selected call on the extension connected to the second tier FMS based upon at least one attribute thereof, in accordance with the security rules of the second tier security policy; and designating each of the security rules of the first tier security policy as being either required or optional;

wherein the second tier security policy includes all of the rules of the first tier security policy designated as being required and a subset of the rules of the first tier security policy designated as being optional.

71. The method of claim 70 wherein the first and second FMSes are located in locations remote from one another and are connected to one another via at least one TCP/IP connection.

* * * * *